United States Patent
Murakami et al.

(10) Patent No.: US 6,524,217 B1
(45) Date of Patent: Feb. 25, 2003

(54) APPARATUS FOR CONTROLLING VEHICLE DRIVE UNITS

(75) Inventors: Akira Murakami, Susono (JP); Masanori Ohtake, Susono (JP); Hiroatsu Endo, Susono (JP); Yuji Iwase, Susono (JP); Mitsuhiro Umeyama, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 85 days.

(21) Appl. No.: 09/678,614

(22) Filed: Oct. 4, 2000

(30) Foreign Application Priority Data

Oct. 8, 1999 (JP) .............................. 11-287935

(51) Int. Cl.[7] .......................... B60K 41/02; B60K 1/00; B60K 6/00; B60K 16/00
(52) U.S. Cl. ....................... 477/5; 477/6; 477/8; 475/5; 180/65.2; 180/65.3; 180/65.6
(58) Field of Search .............................. 477/5, 6, 8, 11, 477/906; 475/4, 5; 180/65.2–65.5; 701/62

(56) References Cited

U.S. PATENT DOCUMENTS

| | | | |
|---|---|---|---|
| 3,650,345 A | * 3/1972 | Yardney | 180/65 A |
| 3,862,429 A | * 1/1975 | Bucher | 290/37 |
| 5,697,466 A | * 12/1997 | Moroto et al. | 180/65.2 |
| 6,009,371 A | * 12/1999 | Kobayashi | 701/112 |
| 6,175,785 B1 | * 1/2001 | Fujisawa et al. | 701/22 |

FOREIGN PATENT DOCUMENTS

| | | |
|---|---|---|
| JP | 6-17727 | 1/1994 |
| JP | 10-67243 | 3/1998 |
| JP | 11-82261 | 3/1999 |

* cited by examiner

Primary Examiner—Sherry Estremsky
Assistant Examiner—Tisha D. Lewis
(74) Attorney, Agent, or Firm—Oblon, Spivak, McClelland, Maier & Neustadt, P.C.

(57) ABSTRACT

A control apparatus for controlling an automotive vehicle having an internal combustion engine provided as one drive unit for driving the vehicle, a starter motor for starting the engine, a clutch device which is released to substantially disconnect a power transmitting path between the drive wheels and the engine, and another drive unit operatively connected to drive wheels, the control apparatus including a first engine-starting device for placing the clutch device in its released state and activating the starter motor to start the engine, when the vehicle is running in a running condition in which the engine cannot be started with a kinetic energy of the vehicle while the clutch device is placed in its engaged state, and a second engine-starting device for placing the clutch device in the engaged state, to start the engine with the vehicle kinetic energy, when the vehicle is running in a running condition in which the engine can be started with the kinetic energy with the clutch device held in the engaged state.

15 Claims, 11 Drawing Sheets

| SHIFT LEVER POSITION | MODE | ENGAGED (◯) OR RELEASED (✕) | | |
|---|---|---|---|---|
| | | C1 | C2 | B1 |
| B,D | ETC MODE | ✕ | ◯ | ✕ |
| | DIRECT MODE | ◯ | ◯ | ✕ |
| | MOTOR DRIVE MODE | ◯ | ✕ | ✕ |
| N,P | NEUTRAL MODE 1,2 | ✕ | ✕ | ✕ |
| | CHARGING & ENGINE START MODE | ✕ | ✕ | ◯ |
| R | MOTOR DRIVE MODE | ◯ | ✕ | ✕ |
| | FRICTION DRIVE MODE | ◯ | ✕ | ◯ |

APPARATUS FOR CONTROLLING VEHICLE DRIVE UNITS

This application is based on Japanese Patent Application No. 11-287935 filed Oct. 8, 1999, the contents of which are incorporated hereinto by reference.

BACKGROUND OF THE INVENTION

1. Field of the Invention

The present invention relates to a control apparatus for controlling an automotive vehicle having a plurality of vehicle drive units.

2. Discussion of Related Art

There is known a four-wheel-drive automotive vehicle of the type wherein front drive wheels are driven by an internal combustion engine, while rear drive wheels are driven by an electric motor. An example of this type of vehicle is disclosed in JP-A-10-67243. This type of four-wheel-drive vehicle has advantages of improved drivability owing to the provision of the four drive wheels, and a higher degree of fuel economy owing to normal vehicle running by the front wheels driven by the internal combustion engine, than a vehicle wherein the output of an internal combustion engine is mechanically transmitted to the front and rear drive wheels. Further, the vehicle can be run in an emergency mode by the rear wheels driven by the electric motor, even in the event of a failure of the internal combustion engine, until a battery for the electric motor is exhausted.

JP-A-10-67243 disclosing the four-wheel-drive vehicle does not address problems such as a defect taking place upon starting of an internal combustion engine, or a defect of a power transmitting mechanism disposed between the internal combustion engine and the front drive wheels. Nor does it disclose any solutions to such problems. Where a starter motor is provided for starting the internal combustion engine, there exist a problem that the starter motor is required to be comparatively large in size and weight, for the starter motor to have a normally required degree of durability, a problem that the internal to combustion engine cannot be suitably started in the event of a failure of the starter motor, and a problem that the vehicle cannot be run in an emergency mode in the event of a failure of the power transmitting mechanism disposed between the internal combustion engine and the drive wheels.

SUMMARY OF THE INVENTION

The prevent invention was made in view of the background prior art which has been discussed above. It is therefore a principal object of the present invention to provide a vehicle control apparatus which facilitates the starting of an internal combustion engine or permits the automotive vehicle to run even in the event of a failure of a power transmitting mechanism.

The above object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A control apparatus for controlling an automotive vehicle having drive wheels, an internal combustion engine provided as one drive unit for driving the vehicle, a starter motor for starting said internal combustion engine, a clutch device which is released to substantially disconnect a power transmitting path between the drive wheels and the internal combustion engine, and another drive unit operatively connected to drive wheels, the control apparatus comprising:

first engine-starting means for placing said clutch device a released state thereof and activating the starter motor to start the internal combustion engine, when the vehicle is running in a running condition in which the internal combustion engine cannot be started with a kinetic energy of the vehicle while the clutch device is placed in an engaged state thereof; and second engine-starting means for placing the clutch device in the engaged state, to start the internal combustion engine with the kinetic energy of the vehicle, when the vehicle is running in a running condition in which the internal combustion engine can be started with the kinetic energy of the vehicle with the clutch device held in the engaged state.

In the vehicle control apparatus constructed according to the above mode (1) of this invention, the clutch device is released and the starter motor is activated by the first engine-starting means, to start the engine with the starter motor, when the running condition of the vehicle does not permit the internal combustion engine to be started with a kinetic energy of the vehicle with the clutch device in the engaged state. Further, when the vehicle running condition permits the internal combustion engine to be started with the kinetic energy, the clutch is engaged by the second engine-starting means, so that the internal combustion engine is started with the kinetic energy through the engaged clutch device. Thus, the provision of the first and second engine-starting means which are selectively operated facilitates the starting of the internal combustion engine. Further, the starting of the internal combustion engine with the kinetic energy of the vehicle reduces the required frequency of operation of the starter motor, making it possible to reduce the required capacity of the starter motor, resulting in reduced size and weight of the starter motor. The term "substantially disconnect a power transmitting path" does not necessarily mean that a plurality of clutches of the clutch device disposed between the drive wheels and the internal combustion engine are all placed in their released states for mechanically disconnecting the internal combustion engine and the drive wheels, but may mean a state of the power transmitting path in which a power of the internal combustion engine and a rotary motion of the drive wheels are not transmitted therebetween.

(2) A vehicle control apparatus according to the above mode (1), further comprising vehicle drive control means for placing the clutch device in the released state and operating the above-indicated another drive unit to drive the drive wheels for running the vehicle.

According to the above mode (2), the vehicle can be run with the above-indicated another drive unit, without an operation of the internal combustion engine.

(3) A vehicle control apparatus according to the above mode, wherein the first and second engine starting means are operable to start the internal combustion engine while the vehicle is running with the above-indicated another drive unit under the control of the vehicle drive means.

According to the above mode (3), the internal combustion engine can be started while the vehicle is running.

(4) A vehicle control apparatus according to the above mode (3), wherein the above-indicated another drive unit is an electric motor for driving the drive wheels, and the vehicle drive control means is motor drive control means for placing the clutch device in the released state and operating the electric motor for running the vehicle, the first and second engine-starting means being operable to start the internal combustion engine while the vehicle is running with the electric motor under the control of the motor drive control means.

(5) A vehicle control apparatus according to the above mode (4), wherein the internal combustion engine and the electric motor are provided to drive the same drive wheels.

(6) A vehicle control apparatus according to the above mode (1), wherein the internal combustion engine is provided to drive one of a pair of front drive wheels and a pair of rear drive wheels of the vehicle, and the above-indicated another drive unit is provided to drive the other of the pair of front drive wheels and the pair of rear drive wheels.

The vehicle control apparatus according to the above mode (6) of this invention is applicable to a 4-wheel-drive vehicle wherein one of the front and rear wheel pairs is driven by the internal combustion engine, and the other wheel pair is driven by another drive unit. In this arrangement, a mechanism connecting the internal combustion engine to the above-indicated one of the front and rear wheel pairs can be made simpler than in an arrangement in which the above-indicated another drive unit as well as the internal combustion engine is connected to the same wheel pair, for instance, to the pair of front drive wheels.

(7) A vehicle control apparatus for controlling an automotive vehicle having a pair of front drive wheels and a pair of rear drive wheels, and a plurality of drive units including an internal combustion engine for driving one of the pair of front drive wheels and the pair of rear drive wheels, and another drive unit for driving the other of the pair of front drive wheels and the pair of rear drive wheels, the vehicle control apparatus comprising an engine starting device operable to operate the above-indicated another drive unit for driving the above-indicated other of the pair of front drive wheels and the pair of rear drive wheels, to thereby start the internal combustion engine.

In the vehicle control apparatus according to the above mode (7) of the present invention, the above-indicated drive unit is operated by the engine starting device, to drive the above-indicated other pair of drive wheels which is not driven by the internal combustion engine, so that the internal combustion engine is started with a kinetic energy of the vehicle running with the above-indicated other pair of drive wheels rotated by the above-indicated another drive unit. This arrangement makes it possible to reduce the required size and weight of a starter motor if provided for starting the internal combustion engine as needed, or eliminates such an engine starter motor.

(8) A vehicle control apparatus according to the above mode (7), wherein the vehicle has a clutch device which is released to substantially disconnect a power transmitting path between the internal combustion engine and the above-indicated one of the pair of front drive wheels and the pair of rear drive wheels, and the engine starting device is operable after the vehicle has driven with an operation of the above-indicated another drive unit with the clutch device placed in a released state thereof, to place the clutch device in an engaged state thereof to thereby start the internal combustion engine with a kinetic energy of the vehicle.

In the vehicle control apparatus according to the above mode (8), the internal combustion engine is started after the vehicle speed has been considerably increased during running of the vehicle with the above-indicated another drive unit while the clutch device is in the released state. Accordingly, the load of the above-indicated another drive unit is reduced after the engine is started, and the load of a starter motor if provided for starting the internal combustion engine can be reduced, or the starter motor may be eliminated.

(9) A vehicle control apparatus for controlling an automotive vehicle having a pair of front drive wheels and a pair of rear drive wheels, a plurality of drive units including an internal combustion engine for driving one of the pair of front drive wheels and the pair of rear drive wheels and another drive unit for driving the other of the pair of front drive wheels and the pair of rear drive wheels, and a starter motor for starting the internal combustion engine, the vehicle control apparatus comprising:

starter-motor-defect determining means for determining whether the starter motor is defective; and engine starting means operable when the starter-motor-defect determining means determines that the starter motor is defective, to operate the above-indicated another drive unit to drive the other of the pair of front drive wheels and the pair of rear drive wheels, for running the vehicle, to thereby start the internal combustion engine with a kinetic energy of the vehicle.

According to the vehicle control apparatus constructed according to the above mode (9) of this invention, the internal combustion engine is started with a kinetic energy of the vehicle running with the above-indicated other pair of drive wheels driven by the above-indicated another drive unit, when the starter-motor-defect determining means determines that the starter motor is defective. Thus, the internal combustion engine can be started even when the starter motor fails to normally function.

(10) A vehicle control apparatus for controlling an automotive vehicle having a plurality of drive units including a first drive unit for driving one of a pair of front drive wheel and a pair of rear drive wheels through a power transmitting mechanism, and a second drive unit for driving the other of the pair of front drive wheels and the pair of rear drive wheels, the vehicle control apparatus comprising:

transmitting-mechanism-defect determining means for determining whether the power transmitting mechanism is defective; and provisional-vehicle-running control means operable when the transmitting-mechanism-defect determining means determines that the power transmitting mechanism is defective, to operate the second drive unit to drive the other of the pair of front drive wheels and the pair of rear drive wheels, for effecting provisional running of the vehicle.

According to the vehicle control apparatus constructed according to the above mode (10) of the present invention, the vehicle is provisionally run with the above-indicated other pair of drive wheels driven by the above-indicated second drive unit, when the transmitting-mechanism-defect determining means determines that the power transmitting mechanism through which the above-indicated one pair of drive wheels are driven by the first drive unit is defective. Thus, the vehicle can be run even when the power transmitting mechanism fails to normally function.

(11) A vehicle control apparatus according to the above mode (10), wherein the transmitting-mechanism-defect determining means determines whether the power transmitting mechanism fails to transmit a power of the first drive unit to the above-indicated one of the pair of front drive wheels and the pair of rear drive wheels.

According to the vehicle control apparatus according to the above mode (11), the vehicle can be run even when the power transmitting mechanism fails to normally operate to transmit power from the first drive unit to the above-indicated one pair of drive wheels.

(12) A vehicle control apparatus according to the above mode (10), wherein the provisional-vehicle-running control means operates the second drive unit with an energy generated by the first drive unit while the power transmitting mechanism is defective.

According to the above mode (12), the second drive unit is operated with an energy generated by the first drive unit when the power transmitting mechanism is defective. For instance, a rotary energy generated by an internal combustion engine provided as the first drive unit for driving a pair of front drive wheels is used to operate an electric generator to generate an electric energy, which in turn is used to operate an electric motor provided as the second drive unit for driving a pair of rear wheels. In this case, the vehicle is provisionally run with the rear drive wheels rotated by the electric motor in the event of a failure of the power transmitting mechanism. Since the electric motor is operated with the electric energy generated by the electric generator operated by the internal combustion engine, the vehicle can be run a relatively long distance, irrespective of the electric energy amount stored in a battery connected to the electric motor.

BRIEF DESCRIPTION OF THE INVENTION

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
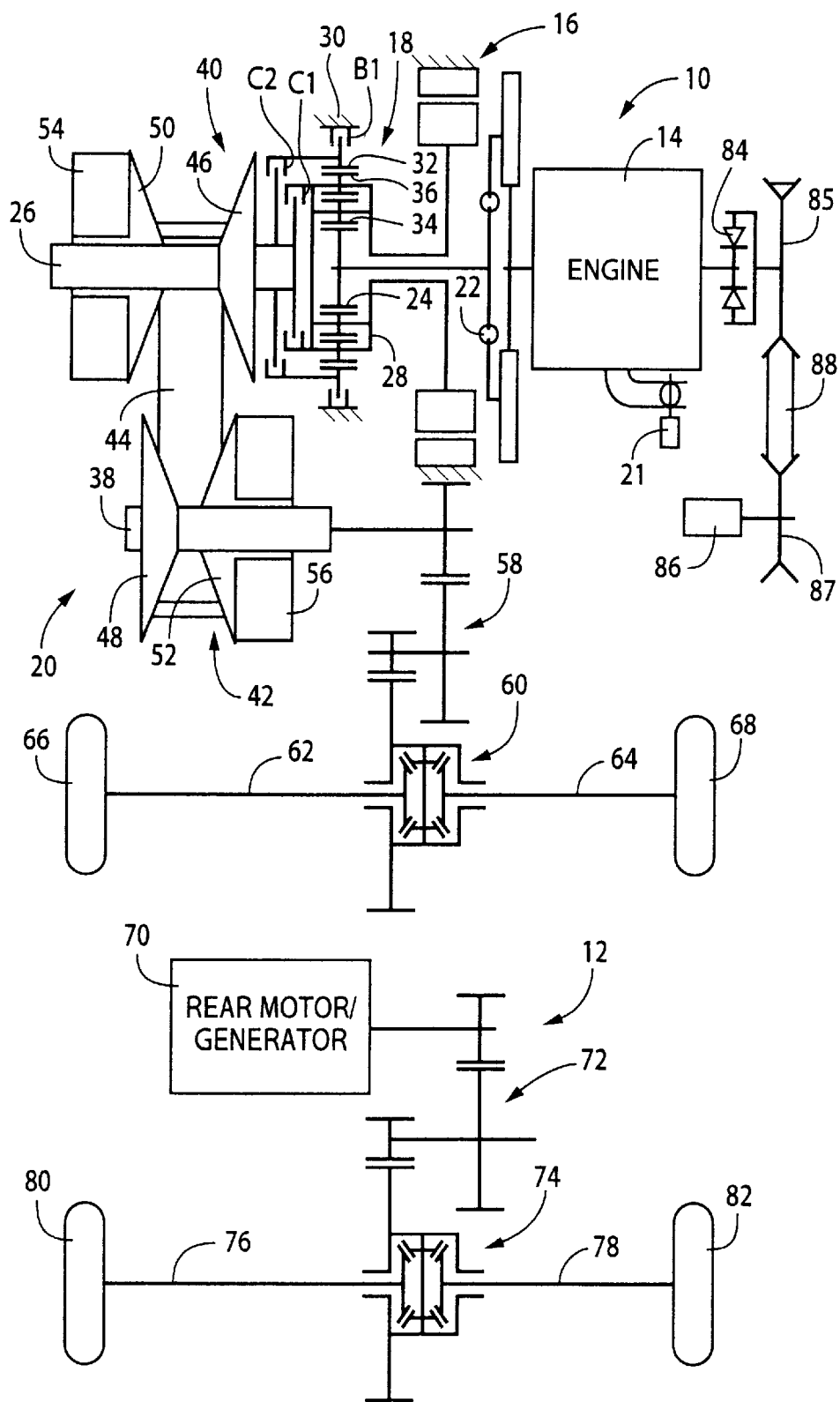
FIG. 1 is a schematic view showing an arrangement of a power transmitting system of a four-wheel-drive vehicle equipped with a control apparatus constructed according to one embodiment of this invention.

Referring first to the schematic view of FIG. 1, there is shown an arrangement of a power transmitting system in a four-wheel-drive vehicle having front and rear drive wheels, which is provided with a control apparatus according to the principle of this invention. This four-wheel-drive vehicle has a plurality of drive devices, namely, a first drive device in the form of a main drive device 10 including a first drive unit for driving the front drive wheels, and a second drive device in the form of an auxiliary drive device 12 including a second drive unit for driving the rear drive wheels.

The main drive device 10 includes an engine 14, a motor/generator 16 (hereinafter abbreviated as "M/G 16"), a planetary gear device 18 of double-pinion type, and a continuously variable transmission 20, which are arranged coaxially with each other. The engine 14 is an internal combustion engine operated by combustion of an air-fuel mixture, and the M/G 16 selectively functions as an electric motor or an electric generator. The continuously variable transmission 20 is operated so as to continuously change its speed ratio. As indicated above, the engine 14 functions as the first or main drive unit, and is provided with a throttle actuator 21 for operating a throttle valve provided for controlling a quantity of intake air that is introduced into an intake pipe, more specifically, for controlling an angle of opening $\theta_{TH}$ of the throttle valve. The M/G 16 functions as another drive unit.

The planetary gear device 18 is a synthesizing/distributing mechanism constructed to mechanically synthesize forces or distributing a force, and includes three rotary elements that are rotatable about a common axis, that is, a sun gear 24, a carrier 28 and a ring gear 32. The sun gear 24 is connected to the engine 14 through a damper 22, and the carrier 28 is connected to an input shaft 26 of the continuously variable transmission 20 through a first clutch C1 and to an output shaft of the motor/generator. The ring gear 32 is connected to the input shaft 26 of the continuously variable transmission 20 through a second clutch C2 and to a stationary member in the form of a housing 30 through a brake B1. The carrier 28 supports a pair of pinions (planetary gears) 34, 36 which mesh with each other and with the sun gear 24 and the ring gear 32, such that the pinions 34, 36 are rotatable about their axes, respectively. Each of the first and second clutches C1, C2 and the brake B1 is a hydraulically operated frictional coupling device including a plurality of mutually superposed friction plates and a hydraulic actuator for forcing the friction plates against each other and releasing the friction plates away from each other. The clutch or brake C1, C2, B1 is engaged when the friction plates are forced against each other, and is released when the friction plates are released away from each other.

The planetary gear-device 18 cooperates with the M/G 16 connected to the carrier 28, to constitute an electric torque converter (ETC) adapted to control the amount of electric energy to be generated by the M/G 16 during an operation of the engine 14, that is, during rotation of the sun gear 24, so as to gradually increase the drive torque of the M/G 16 or the reaction force of the carrier 28, for thereby gradually or smoothing increasing the rotating speed of the ring gear 32 so as to permit smooth starting of the vehicle. If the gear ratio of the planetary gear device 18, which is a ratio of the number of teeth of the sun gear 24 to the number of teeth of the ring gear 32, is represented by ρ, there exists the following relationship among a torque value $T_R$ of the ring gear 32, a torque value $T_C$ of the carrier 28 and a torque value $T_S$ of the sun gear 24:

$$T_R:T_C:T_S=1/\rho:(1-\rho)/\rho:1$$

Where the gear ratio ρ is equal to 0.5 as in an ordinary planetary gear device, the torque of the engine 14 is boosted to 1/ρ, that is, two times, before it is transmitted to the continuously variable transmission. Thus, the vehicle is placed in a torque boosting mode (electric torque converter or ETC mode) while the electric torque converter (ETC) is in operation.

The continuously variable transmission 20 has a pair of variable-diameter pulleys 40, 42 that are mounted on the input shaft 26 and an output shaft 38, respectively, and a transmission belt 44 connecting these pulleys 40, 42. As described below, the effective diameters of the pulleys 40, 42 can be changed continuously. The pulleys 40, 42 include respective stationary rotary members 46, 48 fixed on the input shaft 26 and an output shaft 38, respectively, and respective movable rotary members 50, 52 mounted on the input and output shafts 26, 38, respectively such that the movable rotary members 50, 52 are axially movable relative to the respective input and output shafts 26, 38 and are rotated with these shafts 26, 38. The movable rotary members 50, 52 cooperate with the respective stationary rotary members 46, 48 to define V-grooves therebetween. The pulleys 40, 42 further include respective hydraulic cylinders 54, 56 adapted to axially move the respective movable rotary members 50, 52 relative to the input and output shafts 26, 38, for thereby changing the effective diameters of the variable-diameter pulleys 40, 42, so that a speed ratio γ of the continuously variable transmission 20 can be changed. The speed ratio γ is a ratio of the rotating speed of the input shaft 26 to the rotating speed of the output shaft 38.

The output torque of the continuously variable transmission 20 is transmitted from its output shaft 38 to a pair of front wheels 66, 68 through a speed reducing device 58, a differential gear device 60, and a pair of front axles 62, 64. In FIG. 1, a steering device for changing the steering angle of the front wheels 66, 68 is not shown.

The auxiliary drive device 12 includes a rear motor/generator 70 (hereinafter abbreviated as "RMG 70") that functions as the second or auxiliary drive unit. The output torque of the RMG 70 is transmitted to a pair of rear wheels 80, 82 through a speed reducing device 72, a differential gear device 74 and a pair of rear axles 76, 78.

A V-pulley 85 is connected through a one-way clutch 84 to the crankshaft of the engine 14, while a V-pulley 87 is fixed to the output shaft of a starter motor 86. These V-pulleys 85, 87 are connected to each other by a transmission belt 88, so that the engine 14 can be started by the starter motor 86. The one-way clutch 84 is engaged to transmit a rotary motion of the starter motor 86 to the engine 14, but is released when a rotary motion of the engine 14 is transmitted to the clutch 84 in the direction towards the V-pulley 85. The V-pulleys 85, 87 are formed from a steel plate or formed of a synthetic resin, while the transmission belt 88 connecting these V-pulleys 85, 87 is formed of a synthetic rubber or resin reinforced by a steel wire as well known in the art.

Figure 2:
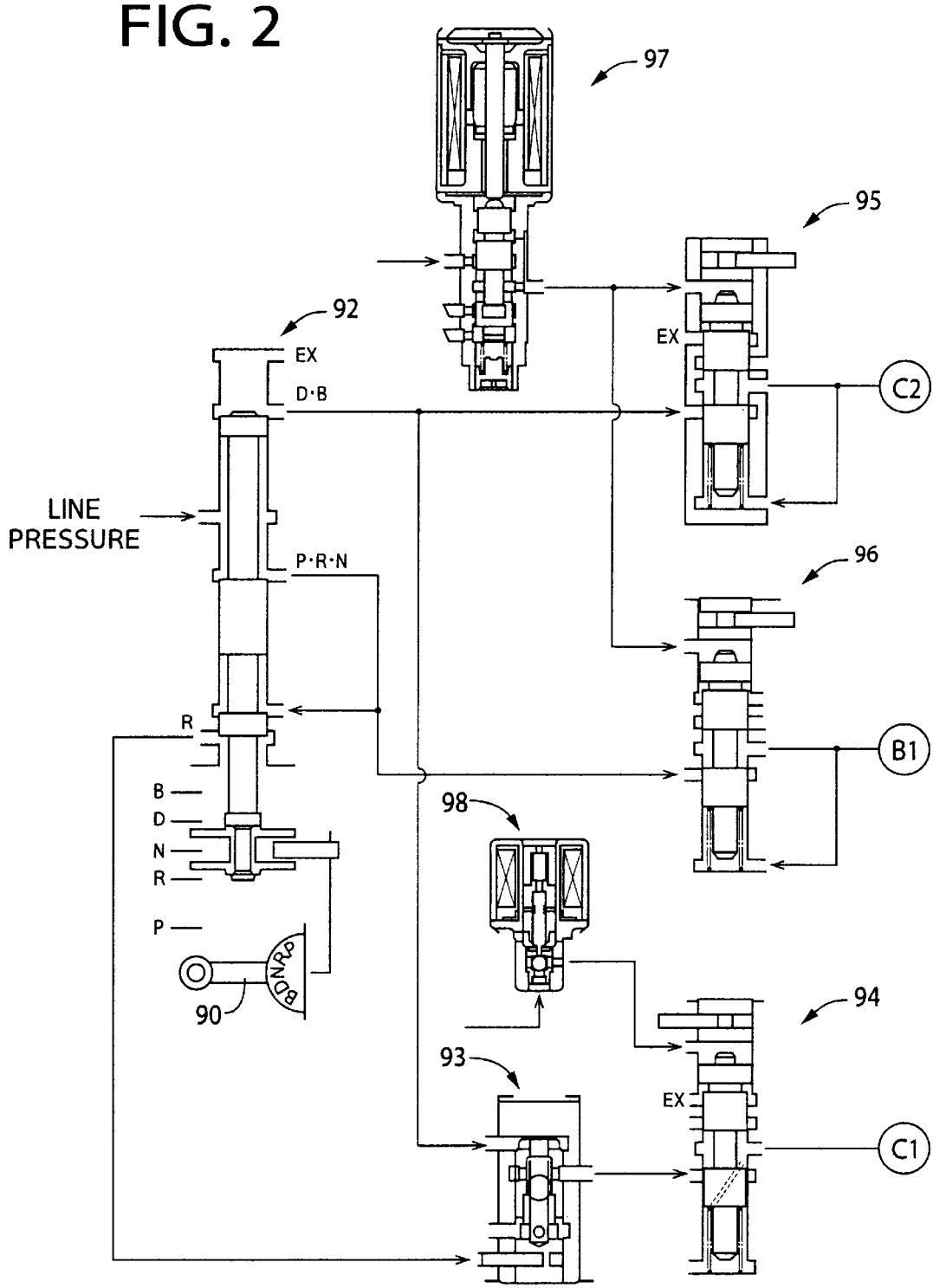
FIG. 2 is a view showing a portion of a hydraulic control device for controlling a planetary gear device used in the power transmitting system of FIG. 1.

Referring to FIG. 2, there is illustrated an arrangement of a hydraulic control device adapted to selectively establish various operating modes of the planetary gear device 18 of the main drive device 10. The hydraulic control device includes a manual valve 92 mechanically connected to a shift lever 90 which is operated by the vehicle operator to a selected one of five operating positions P, R, N, D and B. The manual valve 92 is adapted to receive a line pressure generated by an oil pump (not shown), and apply the line pressure to a selected one of a first pressure-regulating valve 94, a second pressure-regulating valve 95 and a third-pressure regulating valve 96, depending upon the currently selected position of the shift lever 90. Namely, when the shit lever 90 is placed in one of the operating positions D, B and R, the manual valve 92 applies the line pressure through a shuttle valve 93 to the first pressure-regulating valve 94 for regulating an engaging pressure of the first clutch C1. When the shift lever 90 is place in one of the operating positions D and B, the manual valve 92 applies the line pressure to the second pressure-regulating valve 95 for regulating an engaging pressure of the second clutch C2. When the shift lever 90 is placed in one of the operating positions N, P and R, the manual valve 92 applies the line pressure to the third pressure-regulating valve 96 for regulating an engaging pressure of the brake B1. The second and third pressure-regulating valves 95, 96 are adapted to receive a pilot pressure from a linear solenoid valve 97 controlled by a hybrid control device 104, for controlling the engaging pressures of the second clutch C2 and the brake B1. On the other hand, the first pressure-regulating valve 94 is adapted to receive a pilot pressure from a three-way valve in the form of a solenoid-operated shut-off valve 98 controlled by the hybrid control device 104, for controlling the engaging pressure of the first clutch C1. The duty cycle or ratio of the shut-off valve 98 is controlled by the hybrid control device 104.

Figure 3:
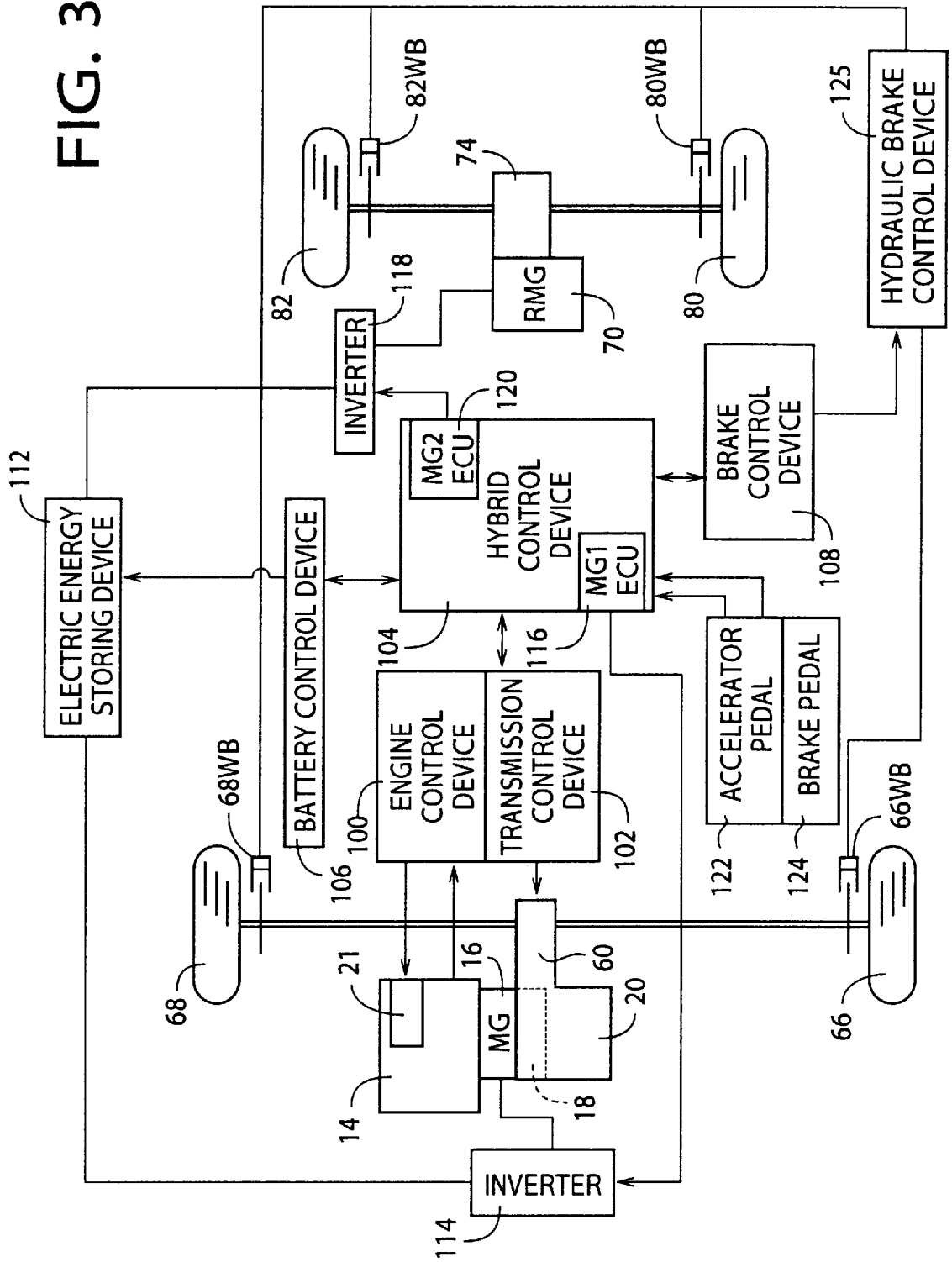
FIG. 3 is a view illustrating various control devices provided for the four-wheel-drive vehicle of FIG. 1.

Reference is now made to FIG. 3, there are illustrated various control devices of a control apparatus provided for the four-wheel-drive vehicle of FIG. 1. The vehicle control apparatus includes an engine control device 100, a transmission control device 102, the hybrid control device 104 indicated above, a battery control device 106 and a brake control device 108. Each of these control devices 100, 102, 104, 106, 108 is a so-called microcomputer incorporating a central processing unit (CPU), a random-access memory (RAM), a read-only memory (ROM), and an input/output interface. The CPU processes input signals according to control programs stored in the ROM while utilizing a temporary data storage function of the RAM, for performing various controls of the vehicle. The control devices 100–108 are capable of effecting data communications with each other, such that appropriate signals requested by one of the control devices are transmitted from another control device in response to a request received from the above-indicated one control device.

The engine control device 100 effects various controls of the engine 14, such as a fuel injection control for controlling a fuel injection valve so as to control the amount of fuel to be injected into the engine 14, an ignition timing control for controlling an igniter for controlling the ignition timing, and a traction control for controlling the throttle actuator 21 to temporarily reduce the output of the engine 14 so that the slipping tendency of the front drive wheels 66, 68 is reduced to enable the front drive wheels 66, 68 to have a sufficient road-surface gripping force, that is, to generate a sufficient vehicle traction force.

The transmission control device 102 is adapted to hold the tension of the transmission belt 44 at an optimum value and control the speed ratio γ of the continuously variable transmission 20. Described more specifically, the transmission control device 102 controls a pressure-regulating valve provided for adjusting the tension of the transmission belt 44, on the basis of the presently established speed ratio γ and the actual transmission torque of the transmission 20 (namely, the output torque of the engine 14 and the MG 16), and according to a predetermined relationship among the tension of the belt 44 and the speed ratio and transmission torque of the transmission 20. This relationship, which is stored in the ROM of the transmission control device 102, is formulated so as to optimize the belt tension. For controlling the speed ratio γ of the transmission 20, the transmission control device 102 determines a desired speed ratio value γ*, on the basis of the actual vehicle running speed V and the actual load on the engine 14 (as represented by the opening angle $θ_{TH}$ of the throttle valve or the operating amount $A_{CC}$ of an accelerator pedal 122), and according to a predetermined relationship among the desired speed ratio value γ* and the vehicle running speed V and engine load. This relationship, which is also stored in the ROM, is formulated to permit the engine 14 to operate according to a minimum fuel consumption curve or a maximum efficiency curve.

Figures 4, 5:
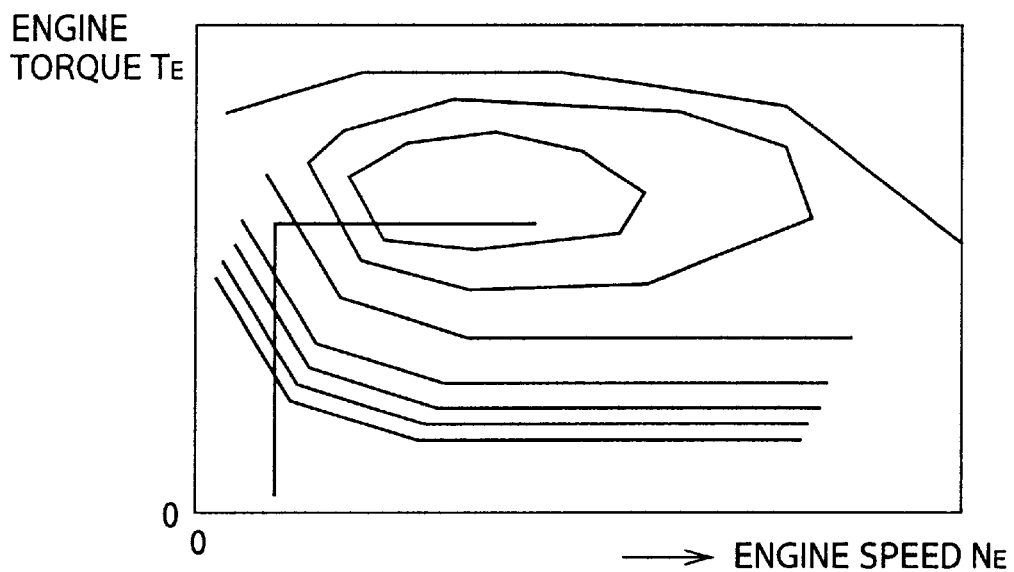
FIG. 4 is a graph showing maximum fuel economy lines for explaining operations of an engine control device and a transmission control device shown in FIG. 3.
FIG. 5 is a view showing various vehicle operating modes selected by a hybrid control device shown in FIG. 3.

For instance, the engine control device 100 and the transmission control device 102 control the throttle actuator 21, the fuel injection valve and the speed ratio γ of the continuously variable transmission 20, so that the engine 14 is operated such that the operating state of the engine 14 as represented by its output torque $T_E$ and speed $N_E$ follows the maximum fuel economy lines indicated in FIG. 4. Further the engine control device 100 and the transmission control device 102 controls the throttle actuator 21 and the speed ratio γ so as to change the output torque $T_E$ and speed $N_E$ of the engine 14 according to a control command received from the hybrid control device 104.

The hybrid control device 104 includes a first motor/generator control device 116 (MG1 ECU) for controlling an inverter 114, and a second motor/generator control device 120 (MG2 ECU) for controlling an inverter 118. The inverter 114 is provided to control an electric current to be supplied from an electric energy storing device 112 such as a battery to the MG 16, or an electric current to be generated by the MG 16 to charge the electric energy storing device 112. On the other hand, the inverter 118 is provided to control an electric current to be supplied from the electric energy storing device 112 to the RMG 70 or an electric current to be generated by the RMG 70 to charge the electric energy storing device 112. The hybrid control device 104 selects one of a plurality of operating modes of the vehicle indicated in FIG. 5, on the basis of the selected operating position $P_{SH}$ of the shift lever 90, the operating amount $A_{CC}$ of the accelerator pedal 122, the vehicle running speed V and an amount of electric energy SOC stored in the electric energy storing device 112. Further, the hybrid control device 104 selects a regenerative braking mode or an engine braking mode, on the basis of the operating amount $A_{CC}$ of the accelerator pedal 122 and an operating amount $B_F$ of a brake pedal 124. In the regenerative braking mode, the MG 16 or RMG 70 is operated as an electric generator by a kinetic energy of the running vehicle, to generate an electric energy and to apply a regenerative brake to the running vehicle. In the engine braking mode, the engine 14 is driven by the kinetic energy of the running vehicle so as to apply an engine brake to the running vehicle.

When the shift lever 90 is placed in the operating position B or D for starting the vehicle with a comparatively small load or while the vehicle is running at a constant speed, the hybrid control device 104 selects a MOTOR DRIVE mode, and this mode is established by engaging the first clutch C1 and releasing the second clutch C2 and the brake B1. In this MOTOR DRIVE mode, the vehicle is driven primarily by the MG 16. When the residual electric energy amount SOC stored in the electric energy storing device 112 is reduced below a predetermined lower limit or when the engine 14 is started for increasing the vehicle drive force while the vehicle is driven in the MOTOR DRIVE mode, the hybrid control device 104 selects an ETC mode or a DIRECT mode which will be described, so that the vehicle running is continued in the same state while the MG 16 or RMG 70 is driven by a kinetic energy of the vehicle so as to charge the electric energy storing device 112.

Figure 6:
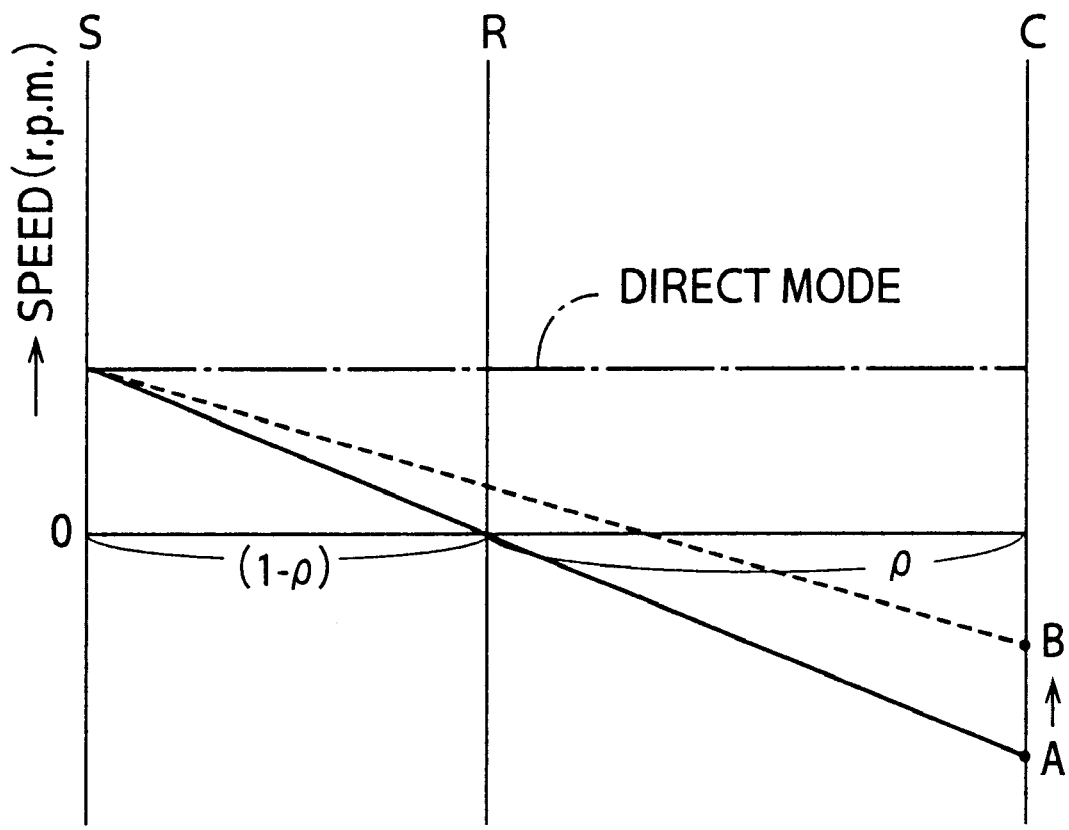
FIG. 6 is a collinear chart for explaining the operating speeds of rotary elements of the planetary gear device shown in FIG. 1.

The DIRECT mode is selected while the vehicle is driven with an intermediate or a comparatively large load. The DIRECT mode is established by engaging the first and second clutches C1 and C2 and releasing the brake B1. In this DIRECT mode, the rotary elements of the planetary gear device 18 are rotated as a unit, and the vehicle is driven primarily by the engine 14, or by the engine 14 and the MG 16, or primarily by the engine 14 while the MG 16 is driven to charge the electric energy storing device 112. In the DIRECT mode, the rotating speed of the sun gear 24 (namely, the rotating speed $N_E$ of the engine 14), the rotating speed of the carrier 28 (namely, the rotating speed $N_{MG}$ of the MG 16) and the rotating speed of the ring gear 32 (namely, the rotating speed $N_{IN}$ of the input shaft 26 of the continuously variable transmission 20 are equal to each other. In this case, the speeds of the sun gear 24, carrier 28 and ring gear 32 are indicated by a one-dot chain line in a two-dimensional collinear chart of FIG. 6, wherein the speeds of the sun gear 24, carrier 28 and ring gear 32 are represented by respective three vertical axes S, R and C, while the speed ratio of the planetary gear device 18 is represented by a horizontal axis. In the collinear chart of FIG. 6, a distance between the vertical axes S and C corresponds to "1", and a distance between the axes R and C corresponds to the gear ratio ρ of the planetary gear device 18 of double-pinion type.

When the vehicle is started, the ETC mode (electric torque converter mode or torque boosting mode) is established by engaging the second clutch C2 and releasing the first clutch C1 and the brake B1. In this ETC mode, the stationary vehicle can be smoothly started with the engine 14 held at a suitable speed, by gradually increasing the amount of electric energy to be generated by the MG 16, that is, the reaction force of the MG 16 (drive torque for operating the MG 16). Where the vehicle and the MG 16 are driven by the engine 14 as in this case, the output torque of the engine 14 is boosted 1/ρ times, for instance, two times where ρ=0.5, and the thus boosted engine torque is transmitted to the continuously variable transmission 14. Where the speed $N_{MG}$ of the MG 16 is represented by point A in the collinear chart of FIG. 6 (namely, a speed of rotation in the reverse direction for generating an electric energy), the input shaft speed $N_{IN}$ of the continuously variable transmission 20 is zero, so that the vehicle is stationary. When the amount of electric energy generated by the MG 16 is increased with a result of an increase of its speed $N_{MG}$ to a value represented by point B, as indicated by broken line in the collinear chart, the input shaft speed $N_{IN}$ of the transmission 20 is accordingly increased, so that the vehicle is started.

When the shift lever 90 is placed in the operating position N or P, the hybrid control device 104 selects a NEUTRAL mode 1 or NEUTRAL mode 2, in principle, and the first and second clutches C1, C2 and the brake B1 are all released. In the NEUTRAL mode 1 or 2, a power transmitting path is disconnected in the planetary gear device 18. When the electric energy amount SOC stored in the electric energy storing device 112 is reduced below the lower limit in this state, the hybrid control device 104 selects a CHARGING & ENGINE START mode, in which the engine 14 is started by the MG 16 while the brake B1 is held in its engaged state. When the shift lever 90 is operated to the operating position R (reverse drive position), for running the vehicle in the reverse direction with a comparatively small load, for example, the hybrid control device 104 selects the MOTOR DRIVE mode, and this mode is established by engaging the first clutch C1 and releasing the second clutch C2 and the brake B1, so that the vehicle is driven in the reverse direction primarily by the MG 16. When the vehicle is driven in the reverse direction with an intermediate or comparatively large load, the hybrid control device 104 selects a FRICTION DRIVE mode, and this mode is established by engaging the first clutch C1 and releasing the second clutch C2 while holding the brake B1 in a slipping state. In the FRICTION DRIVE mode, the output torque of the engine 14 is added to the output torque of the MG 16.

Further, the hybrid control device 104 is adapted to effect a high-$\mu$-road-surface assisting control or a low-$\mu$-road-surface assisting control, as needed. In the high-$\mu$-road-surface assisting control, the RMG 70 is operated to drive the rear wheels 80, 82 to temporarily increase the total vehicle drive force during starting or rapid acceleration of the vehicle by the front drive wheels 66, 68, with a suitable distribution of the front and rear drive forces generated by the respective pairs of front and rear wheels 66, 68, 80, 82. In the low-$\mu$-road-surface assisting control, the RMG 70 is operated to drive the rear wheels 80, 82 while at the same time the front drive force generated by the front wheels 6, 68 is reduced by reducing the speed ratio y of the continuously variable transmission 20, for instance, for facilitating the starting of the vehicle on a road surface having a relatively low friction coefficient $\mu$ such as a frozen or snow-covered road surface.

The battery control device 106 permits the electric energy storing device 112 (e.g., battery or condenser) to be charged with an electric energy generated by the MG 16 or RMG 70 when the residual electric energy amount SOC stored in the electric energy storing device 112 is reduced below the predetermined lower limit $SOC_D$, and inhibits the charging of the electric energy storing device 112 with the electric energy generated by the MG 16 or RMG 70 when the residual electric energy amount SOC exceeds a predetermined lower limit $SOC_U$. Further, the battery control device 106 inhibits the charging of the electric energy storing device 112 when the expected electric power Pb (an amount of energy expected to be consumed+an amount of energy expected to be stored by charging) exceeds an upper limit $W_{IN}$ of electric power or energy input, and inhibits the discharging of the electric energy storing device 112 when the expected electric power Pb becomes smaller than an upper limit to $W_{OUT}$ of electric power or energy output. These upper limits $W_{IN}$ and $W_{OUT}$ change as a function of the temperature $T_B$ of the storing device 112.

The brake control device 108 is adapted to effect a traction control (TRC control), an anti-lock control (ABS control) and a vehicle running stability control (VSC control), for controlling wheels brakes 66WB, 68WB, 80WB and 82WB for braking the respective wheels 66, 68, 80, 82, as needed, through a hydraulic brake control device, for the purpose of improving the running stability of the vehicle or increasing the vehicle traction force, during starting, braking and turning of the vehicle on a road surface having a low friction coefficient $\mu$. For effecting those controls, the brake control device 108 calculates, on the basis of the output signals of wheel speed sensors provided for the wheels 66, 68, 80, 82, peripheral speeds of the wheels 66, 68, 80, 82 (vehicle running speed as calculated on the basis of the rotating speeds of the wheels), namely, a front-right-wheel peripheral speed $V_{FR}$, a front-left-wheel peripheral speed $V_{FL}$, a rear-right-wheel speed $V_{RR}$, and a rear-left-wheel speed $V_{RL}$, and an average front-wheel peripheral speed $V_F=(V_{FR}+V_{FL})/2$ and an average rear-wheel peripheral speed $V_R=(V_{RR}+V_{RL})/2$. Further, the brake control device 108 determines a lowest one of the wheel peripheral speeds ($V_{FR}$, $V_{FL}$, $V_{RR}$, $V_{RL}$) as the vehicle speed V, and calculates slip speeds $\Delta V$ of the front drive wheels 66, 68 as a difference between the peripheral speeds $V_{FR}$, $V_{FL}$ and the peripheral speeds of the rear wheels 80, 82 when the rear wheels 80, 82 are not driven by the RMG 70. The TRC control is initiated when the slip speed $\Delta V$ of either one of the front drive wheels 66, 68 exceeds a TRC initiating threshold $\Delta V1$, that is, when at least one of the front drive wheels 66, 68 has an excessive slipping tendency during starting or running of the vehicle with the front drive wheels 66, 68. In the TRC control, the output torque of the engine 14 is reduced by controlling the throttle actuator 21, while at the same time at least one of the wheel brakes 66WB, 68WB for the front wheels 66, 68 is activated, to reduce the drive force generated by the excessively slipping front drive wheel or wheels 66, 68, so that a slip ratio $RS=(\Delta V/V_R) \times 100\%$ of each front drive wheel 66, 68 is reduced to within a desired amount $R_{S1}$.

The ABS control is effected as needed, during brake application to the vehicle, to control the braking force generated by each of the wheel brakes 66WB, 68WB, 80WB, 82WB for the wheels 66, 68, 80, 82, so that the slip ratio of each wheel under braking is held within an optimum range, for assuring high running stability of the vehicle. During turning of the vehicle, the brake control device 108 determines whether the vehicle has an excessive oversteering or understeering tendency (spinning or drift-out tendency), on the basis of the steering angle of the vehicle detected by a steering angle sensor (not show), the yaw rate of the vehicle detected by a yaw rate sensor (not shown), and the longitudinal and lateral acceleration values of the vehicle detected by a 2-axes acceleration sensor (not shown). The VSC control is effected to eliminate the detected oversteering or understeering tendency, by activating appropriate one or ones of the wheel brakes 66WB, 68WB, 80WB, 82WB and controlling the throttle actuator.

Figure 7:
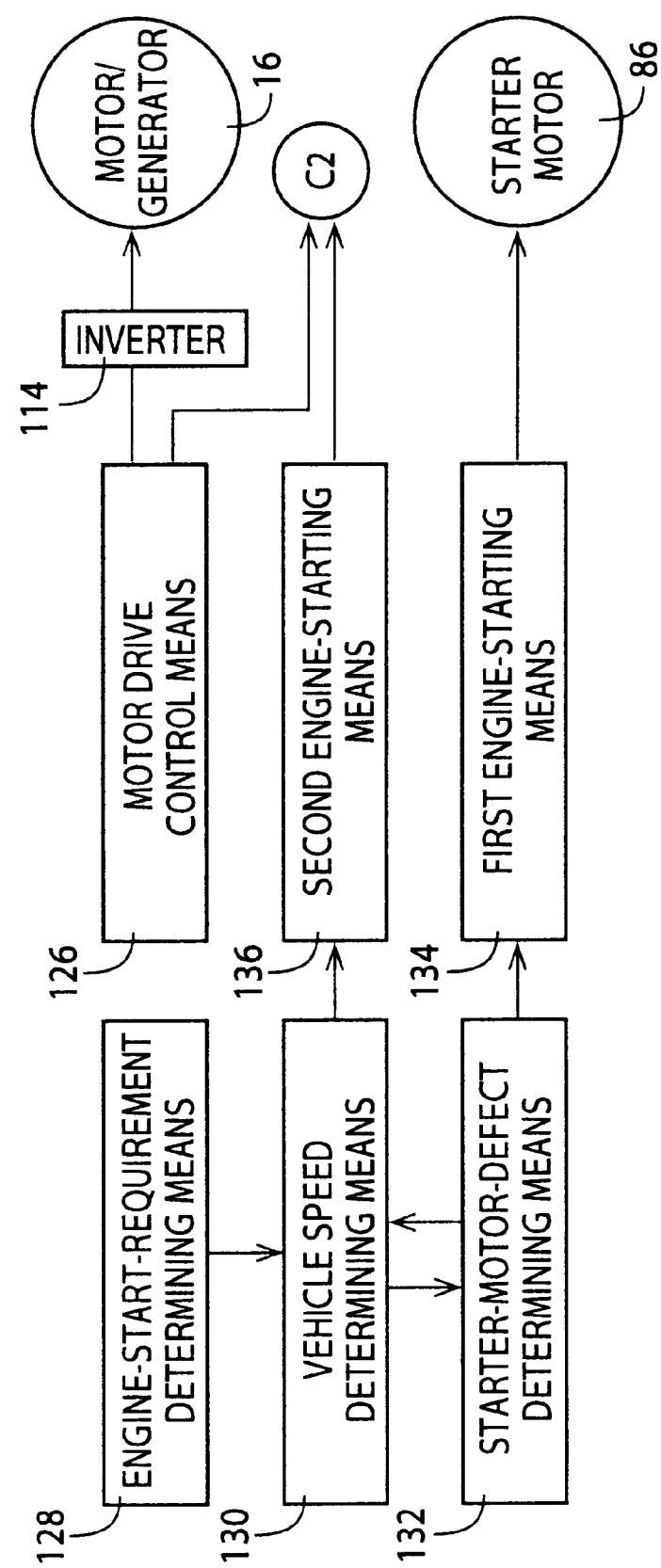
FIG. 7 is a block diagram indicating functional means of the hybrid control device and other control devices shown in FIG. 3.

Referring next to the block diagram of FIG. 7, there are illustrated functional means of the vehicle control apparatus including the hybrid control device 104. The vehicle control is apparatus includes vehicle drive control means in the form of motor drive control means 126, engine-start-requirement determining means 128, vehicle speed determining means 130, starter-motor-defect determining means 132, first engine-starting means 134 and second engine-starting means 137. The motor drive control means 126 is provided for running the vehicle in the MOTOR DRIVE mode in which the second clutch C2 is held in the released state while the MG 16 is operated through the inverter 114. In the MOTOR DRIVE mode, the first clutch C1 is placed in the engaged state while the brake B1 is placed in the released state, and the engine 14 is held at rest, as described above. In the present embodiment, the motor drive control means 126 is an example of drive control means for running the vehicle with a drive device other than the internal combustion engine 14.

The engine-start-requirement determining means 128 is provided for determining whether the engine 14 is required to be started during running of the vehicle in the MOTOR DRIVE mode. This determination is effected by determining whether the operating amount $A_{CC}$ of the accelerator pedal 122 is rapidly increased or the charging of the MG 16 or RMG 70 is requested by the battery control device 106, while the shift lever 90 is placed in the operating position D (forward vehicle drive position). The vehicle speed determining means 130 is provided for determining whether the vehicle running speed V is higher than a lower limit Vp above which the engine 14 can be started by cranking the engine by rotation of the front drive wheels 66, 68 with a kinetic energy of the vehicle. The starter-motor-defect determining means 132 is operable if the vehicle speed determining means 130 determines that the vehicle speed V is not higher than the lower limit Vp and the engine 14 cannot be started by cranking with a kinetic energy of the vehicle. The starter-motor-defect determining means 132 determines whether the starter motor 86 is normal and capable of starting the engine 14. When the engine 14 can be started by the starter motor 86, the first engine-starting means 134 activates the starter motor 86 to start the engine 14. In this case, the first engine-starting means 134 holds the second clutch C2 in the released state to substantially disconnect the engine 14 from the front drive wheels 66, 68, which would be connected to the engine 14 through the input shaft 26 of the continuously variable transmission 20 if the second clutch C2 were held in the engaged state. When the starter motor 86 is defective and is not capable of starting the engine 14, the starter-motor-defect determining means 132 commands the vehicle speed determining means 130 to repeat the determination as to whether the vehicle speed V is higher than the lower limit Vp.

If the vehicle speed determining means 130 determines that the vehicle speed V is higher than the lower limit Vp so that the engine 14 can be started with a kinetic energy of the vehicle, the second engine-starting means 136 commands the second clutch C2 to be placed in the engaged state, so that the MOTOR DRIVE mode is changed to the DIRECT mode in which the front drive wheels 66, 68 are connected to the engine 14 through the continuously variable transmission 20 and the planetary gear device 18. In this state, the engine 14 can be started by cranking with the front drive wheels 66, 68 rotated with a kinetic energy of the vehicle. That is, the second engine-starting means 136 is adapted to engage the second clutch C2 for connecting the engine 14 directly to the front wheels 66, 68 for rotating the engine 14 with the front wheels 66, 68, to thereby start the engine 14. At this time, the RMG 70 is operated to provide an additional vehicle drive force corresponding to a resistance of the engine 14 to the rotary motion of the input shaft 26, so that the vehicle can be maintained at the same running speed V. As described above, when the engine-start-requirement determining means 127 has determined that the engine 14 is required to be started, the first engine-starting means 134 or the second engine-starting means 136 is selectively operated to start the engine 14 by the starter motor 86 or with the kinetic energy of the vehicle. In the present embodiment, the determination as to whether the engine 14 can be started with the second clutch C2 held in the engaged state is effected by the vehicle speed determining means 130 by determining whether the vehicle speed V is higher than the lower limit Vp. It is noted that when the engine 14 is started by the first or second engine-starting means 134, 136, the vehicle is running in the MOTOR DRIVE mode under the control of the motor drive control means 126 or is held stationary but is ready for running.

Figure 8:
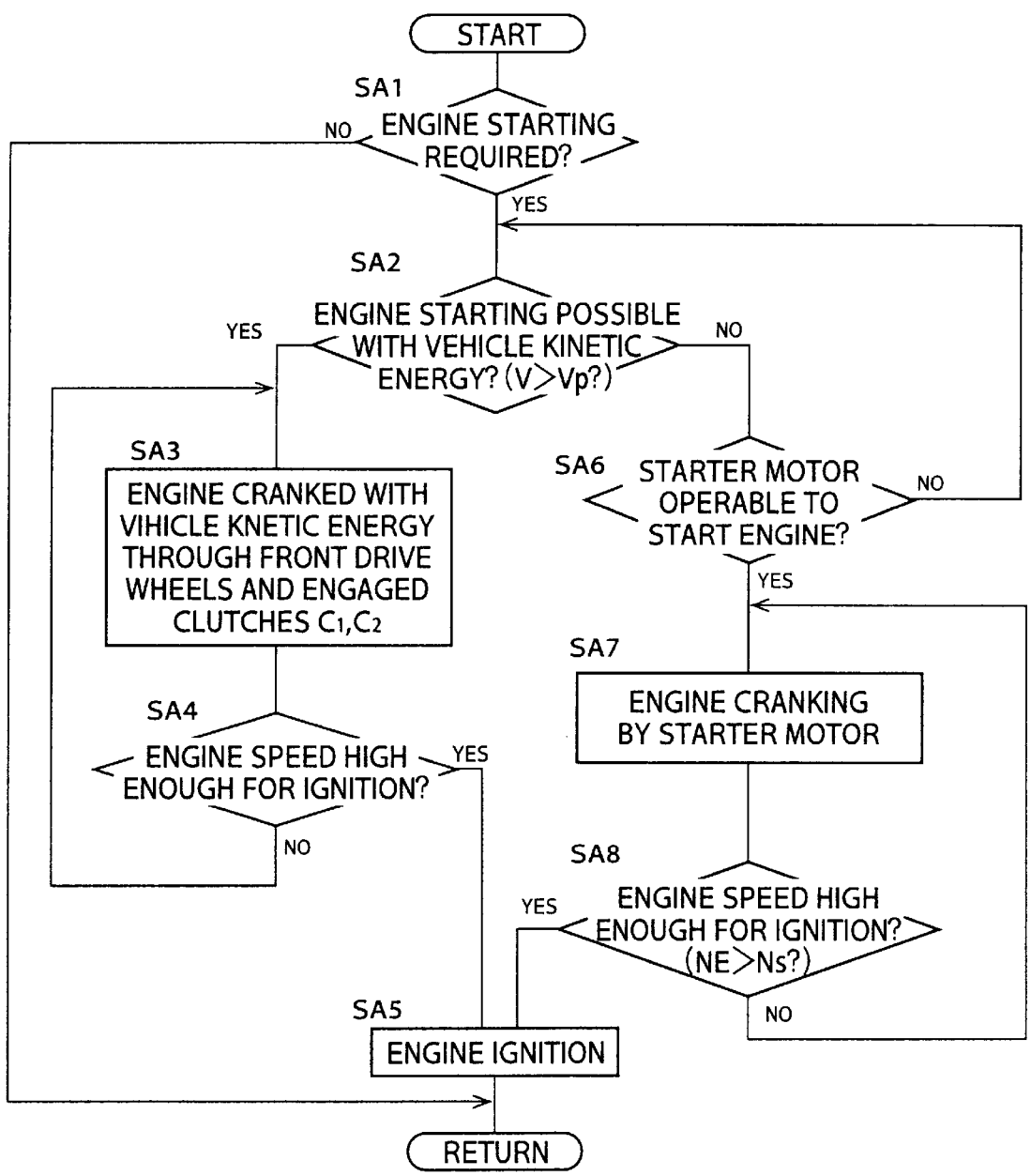
FIG. 8 is a flow chart illustrating an engine starting control routine executed by the hybrid control device and other control devices of FIG. 3.

The hybrid control device 104 executes an engine starting control routine illustrated in the flow chart of FIG. 8, for starting or re-starting the engine 14. When this engine starting control routine is initiated, the vehicle is placed in the MOTOR DRIVE mode with the second clutch C2 held in the released state and the MG 16 controlled under the control of the motor drive control means 126, and with the engine 14 held at rest, while the shift lever 90 is placed in the operating position D. Namely, the vehicle is driven by the MG 16 or held stationary. The engine starting control routine of FIG. 8 is initiated with step SA1 corresponding to the engine-start-requirement determining means 128, for determining whether the engine 14 is required to be started. If a negative decision (NO) is obtained in step SA1, one cycle of execution of the routine is terminated. An affirmative decision (YES) may be obtained in step SA1 when the accelerator pedal 122 is rapidly depressed for rapid acceleration of the vehicle, or when the residual electric energy amount SOC of the electric energy storing device 112 becomes smaller than the lower limit. In this case, the control flow goes to step SA2. If the vehicle is running at this time, the MG 16 or both MG 16 and RMG 70 is/are operated for driving or accelerating the vehicle.

Step SA2 corresponding to the vehicle speed determining means 130 is provided to determine whether the vehicle running speed V is higher than the lower limit Vp above which the engine 14 can be started with a kinetic energy of the vehicle transmitted thereto through the front drive wheels 66, 68. Described in detail, step SA2 is provided to determine whether the engine speed $N_E$ estimated to be reached if the engine 14 is cranked with a kinetic energy of the vehicle running at the present speed V is higher than a predetermined lower limit (e.g., about 400 r.p.m.) above which the engine 14 can be started. If the vehicle speed V is higher than the lower limit Vp, an affirmative decision (YES) is obtained in step SA2, and the control flow goes to steps SA3–SA5 for starting the engine 14 with the vehicle kinetic energy.

In step SA3 corresponding to the second engine-starting means 136, the second clutch C2 as well as the first clutch C1 is engaged, while the brake B1 is held in the released state, so that the DIRECT mode is established in place of the MOTOR DRIVE mode. In the DIRECT mode, the rotary elements of the planetary gear device 18 are rotated as a unit, so that the crankshaft of the engine 14 connected to the sun gear 24 is rotated by the front drive wheels 66, 68. Thus, the engine 14 is cranked with the kinetic energy of the vehicle. The above-indicated "engine speed $N_E$ estimated to be reached if the engine 14 is cranked with a kinetic energy of the vehicle running at the present speed V" is the engine speed $N_E$ estimated when the engine 14 is cranked with the second clutch C2 held in the engaged state. Then, the control flow goes to step SA4 to determine whether the engine speed $N_E$ has been raised to a critical value Ns (e.g., about 700–800 r.p.m.) at which the ignition in the engine 14 is possible. If the engine speed $N_E$ is lower than the critical value Ns, a negative decision (NO) is obtained in step SA4, the control flow goes back to step SA3 to continue the cranking of the engine 14. When the engine speed $N_E$ has reached the critical value Ns, namely, when an affirmative decision (YES) is obtained in step SA4, the control flow goes to step SA5 in which the hybrid control device 104 commands the engine control device 100 to activate the igniter for starting the engine 14.

If the vehicle speed V is not higher than the lower limit Vp, a negative decision (NO) is obtained in step SA2, and the control flow goes to steps SA6–SA8 and SA5 for starting the engine 14 with the starter motor 86. Step SA6 corresponding to the starter-motor-defect determining means 132 is provided to determine whether the starter motor 86 is normal and capable of starting the engine 14. If an affirmative decision (YES) is obtained in step SA6, the control flow goes to step SA7 corresponding to the first engine-starting means 134, in which the engine 14 is cranked with the starter motor 86. Step SA7 is followed by step SA8 to determine whether the engine speed $N_E$ has been raised to the critical value Ns. If a negative decision (NO) is obtained in step SA8, the control flow goes back to step SA7 to continue the cranking of the engine 14 with the starter motor 86. If an affirmative decision (YES) is obtained in step SA8, the control flow goes to step SA5 in which the engine control device 100 is commanded to activate the igniter to start the engine 14, as in the case of the engine starting with the kinetic energy of the vehicle.

If the starter motor 86 is defective and is not capable of starting the engine 14, a negative decision (NO) is obtained in step SA6, and the control flow goes back to step SA2 to permit the vehicle to be run with the MG 16 or both of the MG 16 and the RMG 70. Steps SA2 and SA6 are repeatedly implemented until the vehicle speed V has exceeded the lower limit Vp. The control flow goes to steps SA3–SA5 when the vehicle speed V has become higher than the lower limit Vp, for starting the engine 14 with the kinetic energy of the vehicle with the clutch C2 held in the engaged state, as described above. Thus, even when the starter motor 86 is defective, the engine 14 can be started with the kinetic energy of the vehicle after the vehicle speed V has reached the lower limit Vp.

Referring to the time chart of FIG. 9, there will be described an example of a control operation of the hybrid control device 104 according to the engine starting control routine of FIG. 8, after initiation of operations of the ignition switch and the shift lever 90 by the vehicle operator to start the vehicle. In this specific example, the ignition switch is turned on and the shift lever 90 is operated from the operating position N (neutral position) to the operating position D, at a point of time Ta indicated in the time chart of FIG. 9. As a result, the MG 16 is started, and the clutch C1 is engaged, so that the vehicle is slowly started with a creep torque generated by the MG 16. At the same time, the RMG 70 is started, and the vehicle speed V is gradually raised.

At a point of time Tb, the accelerator pedal 122 is depressed relatively rapidly, so that the engine-start-requirement determining means 128 determines in step SA1 that the engine 14 is required to be started, and the application of the hydraulic pressure to the second clutch C2 through the second pressure-regulating valve 95 is initiated for engaging the clutch C2. At this time, the output torque of the MG 16 or the total output torque of the MG 16 and RMG 70 is increased with an increase in the operating amount $A_{CC}$ of the accelerator pedal 122. Accordingly, the vehicle speed V is raised at a higher rate than before. At this point of time Tb, the engaging action of the second clutch C2 has not been initiated, so that the engine 14 is still disconnected from the front drive wheels 66, 68 with the clutch C2 in the released state.

At a point of time Tc at which the vehicle speed V has exceeded the lower limit Vp, the vehicle speed determining means 130 corresponding to step SA2 determines that the engine 14 can be started with a kinetic energy of the vehicle, with the vehicle speed V being higher than the lower limit Vp, so that the second engine-starting means 136 corresponding to step SA3 is operated to increase the engaging pressure of the second clutch C2, whereby the engaging action of the clutch C2 is initiated, and the cranking of the engine 12 with the kinetic energy of the vehicle is initiated. As a result, the speed $N_E$ of the engine 14 is gradually increased. At a point of time Td at which the engine speed $N_E$ has reached the critical value Ns above which the ignition in the engine 14 is possible. Consequently, the hybrid control device 104 commands the engine control device 100 to activate the igniter for igniting the air-fuel mixture in the engine 14. Thus, the engine 14 is started to initiate the vehicle running with the engine 14 as well as the MG 16, with the clutch C2 held in the fully engaged state. At a subsequent point of time Te at which the engine speed $N_E$ has reached a predetermined value, the MG 16 is turned off, so that the vehicle is driven with only the engine 14. As described above, the engine 14 can be started with the kinetic energy of the vehicle through the clutch C2, without activating the starter motor 86, when the vehicle speed V is higher than the lower limit Vp.

While the engine starting control routine of FIG. 8 is formulated to start the engine 14 with the starter motor 86 when the vehicle speed V is not higher than the lower limit Vp, it is possible to increase the opportunity of starting the engine 14 with a kinetic energy of the vehicle, by delaying the implementation of step SA2 for a suitable length of time after the moment at which the affirmative decision (YES) is obtained in step SA1. The length of this time delay may be determined to be almost equal to a time length during which the vehicle speed V can be increased to the lower limit Vp in an accelerating state of the vehicle during ordinary or normal starting or acceleration of the vehicle, for instance. The thus determined length of time delay may be measured by a suitable timer or time counter which is started when the affirmative decision is obtained in step SA1. This modification permits the engine 14 to be started with the kinetic energy of the vehicle in ordinary starting or accelerating conditions of the vehicle, although the engine 14 is started with the starter motor 86 where it takes a long time for the vehicle speed V to exceed the lower limit Vp, due to a relatively low acceleration value of the vehicle during an uphill running of the vehicle or after the output of the MG 16 is reduced.

In the present embodiment, the engine 14 is started with the starter motor 86 with the second clutch C2 held in the released state under the control of the first engine-starting means 134 in step SA7, where the starting of the engine 14 with a kinetic energy of the vehicle by engagement of the second clutch C2 is not possible. Where the starting of the engine 14 with the kinetic energy by engagement of the clutch C2 is possible, the engine 14 is started by engagement of the clutch C2 under the control of the second engine-starting means 136 in step SA3. Thus, the provision of the two engine-starting means 134, 136 facilitates the starting of the engine 14. Further, the present embodiment is effective to significantly reduce the required frequency of operation and the required durability of the starter motor 86, resulting in reduced size and weight of the starter motor 86, since the engine 14 is started with the kinetic energy of the vehicle as much as possible.

In the present embodiment, the motor drive control means 126 is provided to drive the vehicle in the MOTOR DRIVE mode with the front drive wheels 66, 68 driven by the MG 16 while the clutch C2 is held in the released state. Since the vehicle is running with the MG 16 under the control of the motor drive control means 126 when the starting of the stationary engine 14 is required, the engine 14 can be started with a kinetic energy of the vehicle.

In the present embodiment wherein the second clutch C2 is provided for substantially disconnecting the power transmitting path between the front wheels 66, 68 and the engine 14, the vehicle is first started by the MG 16 with the clutch C2 placed in its released state, and then the engine 14 is started by engaging the clutch C2. Accordingly, the vehicle speed can be considerably increased for an initial period of starting of the vehicle up to the point of time Tc, at which the second engine-starting means 136 is activated to start the engine 14, so that the load of the MG 16 during an initial period of running of the vehicle can be reduced. Even if the starting of the engine 14 with the kinetic energy of the vehicle is not possible, the load of the starter motor 86 can be reduced.

The present embodiment is farther adapted such that when the negative decision is obtained in step SA2, namely, when it is determined that the engine 14 should be started by the starter motor 86, step SA6 corresponding to the starter-motor-defect determining means 132 is implemented to determine whether the starter motor 86 is defective, and such that if the starter motor 86 is determined to be defective, the starting of the engine 14 with the kinetic energy of the vehicle is delayed until the vehicle speed V has reached the lower limit Vp. Thus, where the starter-motor-defect determining means 132 determines that the starter motor 86 fails to normally operate, the engine 14 is started with the kinetic energy only after the vehicle speed V has been increased to the lower limit Vp during running of the vehicle with the front drive wheels 66, 68 driven by the MG 16 or with the front and rear drive wheels 80, 82 driven by the MG 16 and RMG 70, respectively. Thus, the engine 14 can be started with high stability even in the event of a failure of the starter motor 86.

Figure 10:
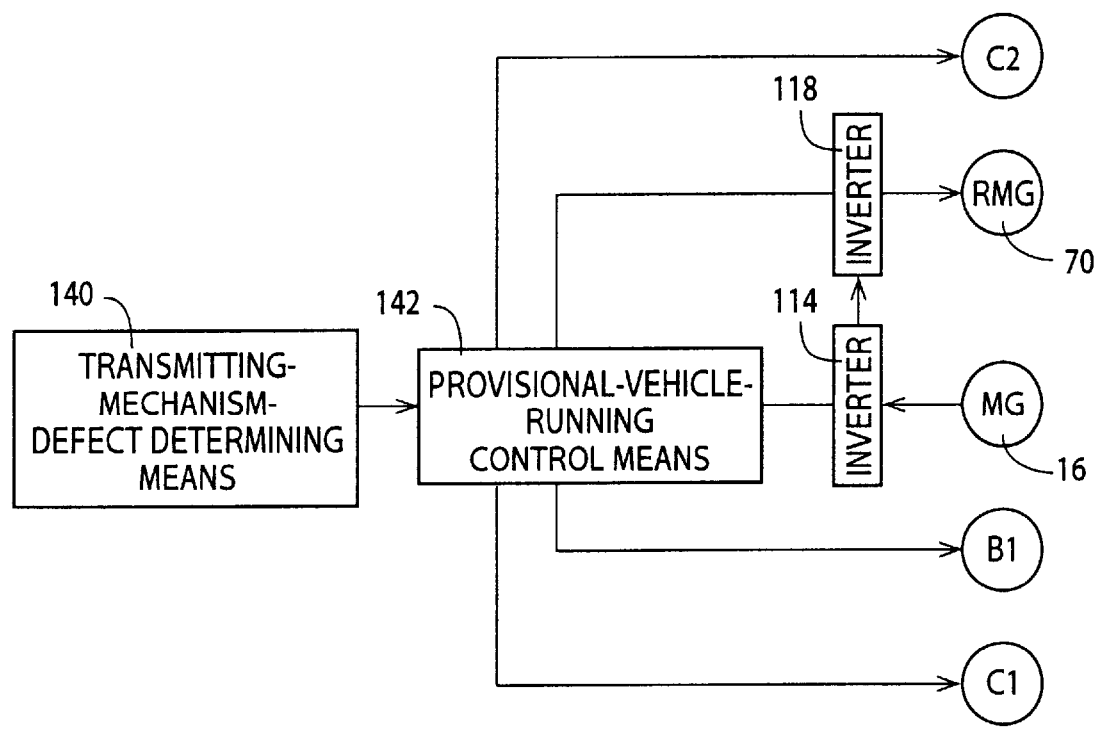
FIG. 10 is a block diagram indicating functional means of a hybrid control device and other control devices according to another embodiment of this invention.
Figure 11:
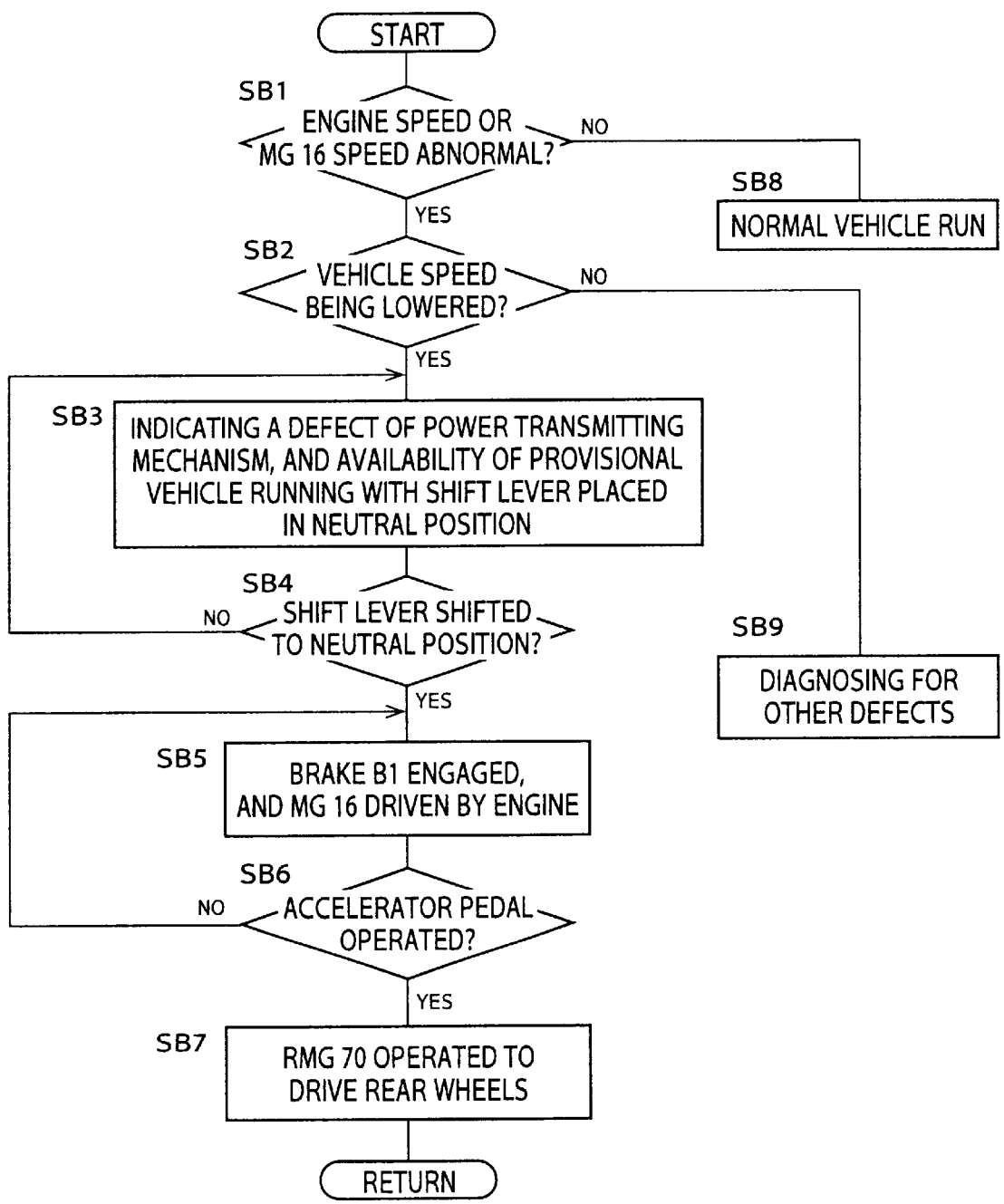
FIG. 11 is a flow chart illustrating a provisional vehicle running control routine executed by the hybrid control device and other control devices of FIG. 11.
Figure 12:
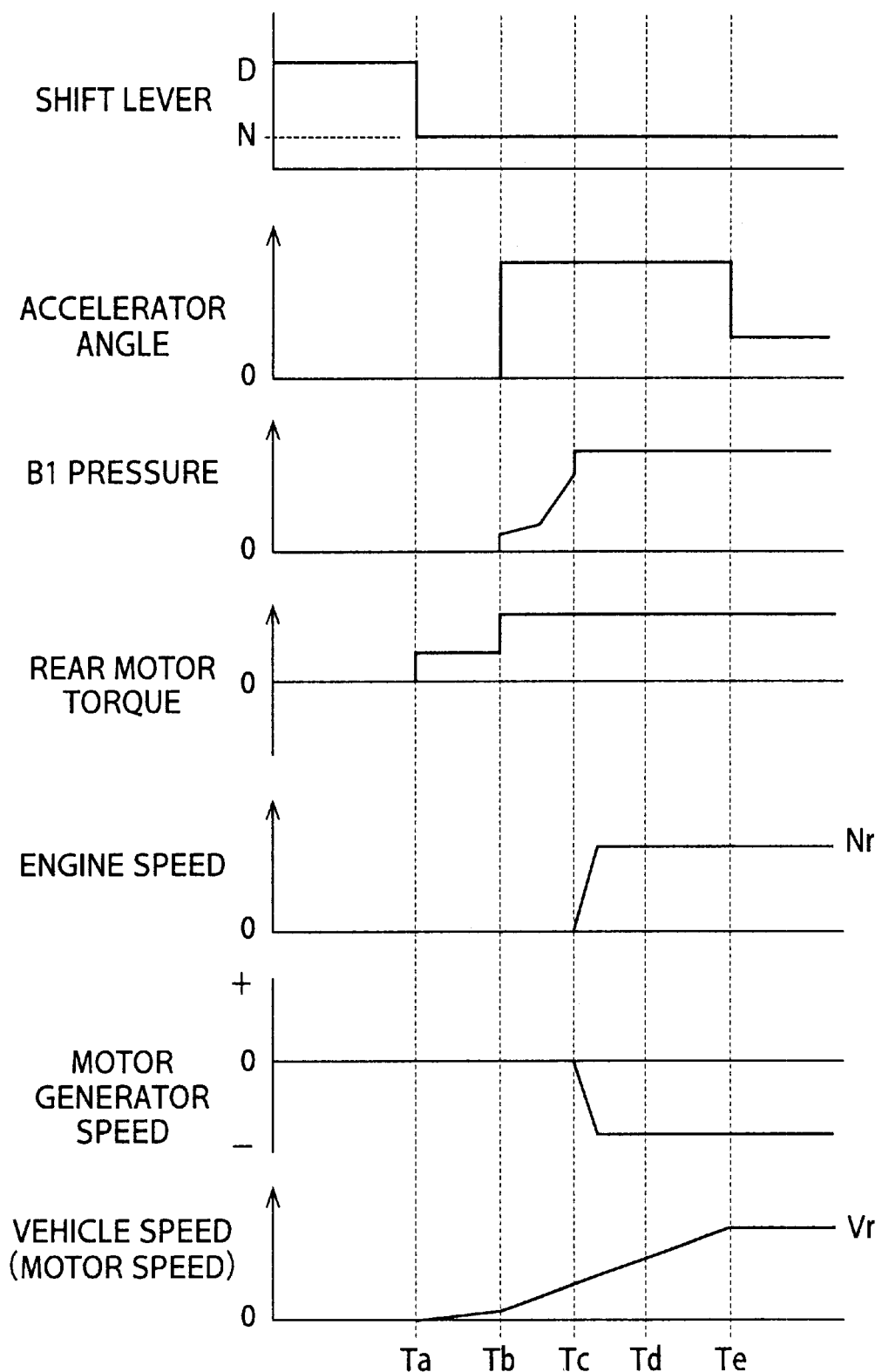
FIG. 12 is a time chart corresponding to the control routine of FIG. 11.

Referring to FIGS. 10–12, there will be described another embodiment of this invention, wherein the same reference signs as used in the first embodiment will be used to identify the functionally corresponding elements.

The block diagram of FIG. 10 illustrates functional means of the hybrid control device 104 and other control devices, which includes transmitting-mechanism-defect determining means 140, and provisional-vehicle-running control means 142. The transmitting-mechanism-defect determining means 140 determines whether there is any defect associated with the power transmitting mechanism between the engine 14 and MG 16 and the front drive wheels 66, 68, such as a defect of the clutch CI, of the planetary gear device 18, and a defect of the transmission belt 44 of the continuously variable transmission 20. This determination by the determining means 140 is effected on the basis of the engine speed $N_E$ and a speed $N_{MG}$ of the MG 16 which are detected by respective sensors disposed near the output shaft of the engine 14 and the output shaft of the MG 16. The term "defect associated with the power transmitting mechanism" used herein is interpreted to mean any defect that prevents the outputs of the engine 14 and MG 16 from being transmitted to the front wheels 66, 68.

When any defect associated with the power transmitting mechanism is detected, the provisional-vehicle-running control means 142 releases the first and second clutches C1, C2 and engages the brake B1, so that the output shaft of the MG 16 is rotated by the engine 14, to generate an electric energy. Further, the provisional-vehicle-running control means 142 controls the inverters 114, 118 so that an electric current is supplied from the MG 16 to the RMG 70 through the inverters 114, 118, and controls the RMG 70 through the inverter 118. In this second embodiment, the engine 14 or MG 16 serves as the first drive unit while the RMG 70 serves as the second drive unit. Where the engine 14 is considered to be the first drive unit, a rotary motion energy of this first drive unit is used to operate the second drive unit in the form of the RMG 70 through the MG 16. Where the MG 16 is considered to be the first drive unit, an electric energy generated by the first drive unit is directly used to operate the second drive unit in the form of th RMG 70.

Reference is now made to the flow chart of FIG. 11 illustrating a provisional vehicle running control routine executed by the hybrid control device 104. Before this routine is initiated, at least one of the output shafts of the engine 14 and MG 16 is rotated with the shift lever 90 placed in the operating position D, and at least one of the clutches C1, C2 is in the engaged state while the brake B1 is placed in the released state. The routine of FIG. 11 is initiated with step SB1 to determine whether the speed $N_E$ of the engine 14 or the speed $N_{MG}$ of the MG 16 is abnormal. If a negative decision (NO) is obtained in step SB11, the control flow goes to step SB8 in which the normal running of the vehicle is continued, and one cycle of execution of the routine is terminated. If either of the speeds $N_E$ and $N_{MG}$ is abnormally high, it means that the power transmitting mechanism is possibly defective. In this case, an affirmative decision (YES) is obtained in step SB1, and the control flow goes to step SB2.

Step SB2 is provided to determine whether the vehicle speed V is in the process of being lowered, that is, whether the abnormally high speed $N_E$ or $N_{MG}$ of the engine 14 or MG 16 is due to a defect associated with the power transmitting mechanism. This determination is based on a rate of change of the vehicle speed V which is obtained from the peripheral speeds of the wheels 66, 68, 80, 82 described above. If the vehicle speed V is not in the process of being lowered, it means that the abnormally high speed $N_E$ or $N_{MG}$ is not due to a defect of the power transmitting mechanism, but due to any other defect. If a negative decision (NO) is obtained in step SB2, the control flow goes to step SB9 to diagnose the vehicle for other defects. In this case, one cycle of execution of the routine is terminated, and the vehicle running with at least one of the MG 16 and RMG 70 is continued. If the vehicle speed V is in the process of being lowered, it means that the abnormally high speed is due to a defect of the power transmitting mechanism. In this case, an affirmative decision (YES) is obtained in step SB2, and the control flow goes to step SB3.

The transmitting-mechanism-defect determining means 140 indicated above corresponds to steps SB1, SB2, which are implemented to detect a defect of the power transmitting mechanism. In step SB3 implemented if a defect of the power transmitting mechanism is detected, suitable indicators are turned on to provide an alarm indication that the power transmitting mechanism is defective, and an indication that a provisional or emergency mode of running (limp running mode) of the vehicle with the shift lever 90 being placed in the operating position N is available. Step SB3 is followed by step SB4 to determine whether the shift lever 90 has been operated (by the vehicle operator) from the operating position D to the operating position N. If a negative decision (NO) is obtained in step SB4, the control flow goes back to step SB3. Steps SB3 and SB4 are repeatedly implemented until the shift lever 90 has been operated to the operating position N. If an affirmative decision (YES) is obtained in step SB4, the control flow goes to step SB5.

In step SB5, the brake B1 is engaged and the clutches C1, C2 are released, in response to the shifting of the shift lever 90 to the operating position N. If the engine 14 is at rest, the engine 14 is started by the starter motor 86 or by reverse rotation of the MG 16. Then, the MG 16 is operated by the started engine 14 to generate an electric energy.

Step SB5 is followed by step SB6 to determine whether the accelerator pedal 122 has been operated. If a negative decision (NO) is obtained in step SB6, the control flow goes back to step SB5. If an affirmative decision (YES) is obtained in step SB6, the control flow goes to step SB7 in which the RMG 70 is operated to drive the vehicle with the rear wheels 80, 82. In the present second embodiment, steps SB5–SB7 correspond to the provisional-vehicle-running control means 142 indicated above. It is noted that step SB6 is provided to initiate the provisional vehicle running with the rear wheels 80, 82 driven by the RMG 70, only after it is confirmed that the vehicle operator has an intention to initiate the provisional vehicle running. Since the provisional vehicle running is effected with an electric energy generated by the MG 16 being supplied to the RMG 70, the vehicle can be run a larger distance than where the RMG 70 is operated with only the electric energy stored in the electric energy storing device 112, so that the vehicle can be moved to a servicing or repairing station. It is noted that steps SB5 and SB6 which are implemented in this order in the present embodiment may be implemented in the reverse order, as indicated in the timing chart of FIG. 12, which will be described.

Referring to the time chart of FIG. 12, there will be described the provisional vehicle running according to the provisional vehicle running control routine of FIG. 11. Prior to a point of time Ta indicated in FIG. 11, a fact that the vehicle running with the front wheels 66, 68 is not available is detected as a result of detection of an excessively high speed $N_E$ of the engine 14 or an excessively high speed $N_{MG}$ of the MG 16 and the lowering of the vehicle speed V, and the indicators are activated to indicate a defect of the power transmitting mechanism and the availability of the provisional vehicle running. Further, the vehicle is stationary with the shift lever 90 placed in the operating position D, prior to the point of time Ta. When the vehicle operator has operated the shift lever 90 from the operating position D to the operating position N at the point of time Ta, the provisional-vehicle-running control means 142 (corresponding to steps SB5–SB7) is activated to operate the RMG 70. As a result, a creep torque is generated by the RMG 70. At this point of time, the accelerator pedal 122 is not operated, but the vehicle is slowly started unless the brake pedal 124 is in operation.

When the accelerator pedal 122 is operated at a point of time Tb, the output torque of the RMG 70 is increased with a result of a gradual increase in the vehicle speed V, and the application of the hydraulic pressure to the brake B1 is initiated. Up to this moment, the vehicle is driven with the RMG 70 operated with the electric energy stored in the electric energy storing device 112. At a point of time Tc at which the engaging action of the brake B1 is completed, the MG 16 is operated in the reverse direction to start the engine 14. The speed $N_E$ of the engine 14 is immediately raised to a predetermined value Nr at which the provisional vehicle running is possible. After a point of time Td, the MG 16 is operated by the engine 14 to initiate the generation of an electric energy. At a point of time Te at which the vehicle speed V has increased to a value Vr at which the provisional vehicle running is continued, the operating amount of the accelerator pedal 122 is reduced by the vehicle operator, and the vehicle is run at the speed Vr.

In the present embodiment, the transmitting-mechanism-defect determining means 140 corresponding to steps SB1 and SB2 is adapted to determine whether the power transmitting mechanism is defective, on the basis of the output speeds $N_E$ and $N_{MG}$ of the engine 14 and MG 16. If the determining means 140 determines that the power transmitting mechanism is defective, the provisional-vehicle-running control means 142 corresponding to steps SB5–SB7 is activated to effect the provisional vehicle running with the rear wheels 80, 82 driven by the RMG 70, so that the vehicle can be run even when the power transmitting mechanism fails to normally function, due to a defect of the clutch C1, C2 or transmission belt 44, for instance.

Further, the provisional-vehicle-running control means 142 is arranged such that the RMG 70 for driving the rear wheels 80, 82 is operated with an electric energy generated by the MG 16 which in turn is operated by the engine 14 through the brake B1. Accordingly, the provisional vehicle running with the RMG 70 can be continued for a long time, irrespective of the residual electric energy amount SOC in the electric energy storing device 112, even when the power transmitting mechanism is defective.

While the presently preferred embodiments of this invention have been described above by reference to the accompanying drawings, it is to be understood that the invention may be otherwise embodied.

In the illustrated embodiments, the front wheels 66, 68 are driven by the main drive device 10 equipped with the engine 14 and the MG 16, while the rear wheels 80, 82 are driven by the auxiliary drive device 12 equipped with the RMG 70. However, it is possible that the rear wheels 80, 82 are driven by the main drive device 10, while the front wheels 66, 68 are driven by the auxiliary drive device 12.

The control apparatus according to the illustrated embodiments is adapted for use with a four-wheel-drive automotive vehicle wherein the main drive device 10 includes the engine 14 and the MG 16, while the auxiliary drive device 12 includes the RMG 70. However, drive units other than the MG 16 and RMG 70 which are provided in addition to the engine 14 may be provided. For instance, those drive units may be other internal combustion engine or engines, gas turbines, or hydraulic motors. The types and locations of the drive units other than the engine 14 are not particularly limited, and may be used to drive the wheels which may or may not be driven by the engine 14. The illustrated embodiments may be modified to eliminate one of the MG 16 and the RMG 70. In the second embodiment wherein the drive unit (RMG 70) other than the engine 14 is required to drive the wheels which are not driven by the engine 14, the MG 16 is not essential.

In the illustrated embodiments, the rotary output energy of the engine 14 is converted by the MG 16 into an electric energy which is supplied to the RMG 70 for driving the rear wheels 80, 82. However, the rotary output energy of the engine 14 may be converted by a hydraulic pump into a hydraulic energy which is supplied to a hydraulic motor for driving the rear wheels 80, 82.

While the starter motor 86 is provided for starting the engine 14 in the illustrated embodiments, the starter motor 86 is not essential since the engine 14 can be started with a kinetic energy of the vehicle while the vehicle is running with the rear wheels 80, 82 driven by the RMG 70.

In the illustrated embodiments, the second clutch C2 is provided to substantially disconnect the power transmitting path between the engine 14 and the front wheels 66, 68, at the planetary gear device 18 of double-pinion type. However, other connecting and disconnecting devices (clutches) may be used for disconnecting the power transmitting path.

Although the engine starting control routine of FIG. 8 is initiated while the vehicle is running in the MOTOR DRIVE mode with an operation of the MG 16, the RMG 70 as well as the MG 16, or only the RMG 70 may be operated in the MOTOR DRIVE mode.

Figure 9:
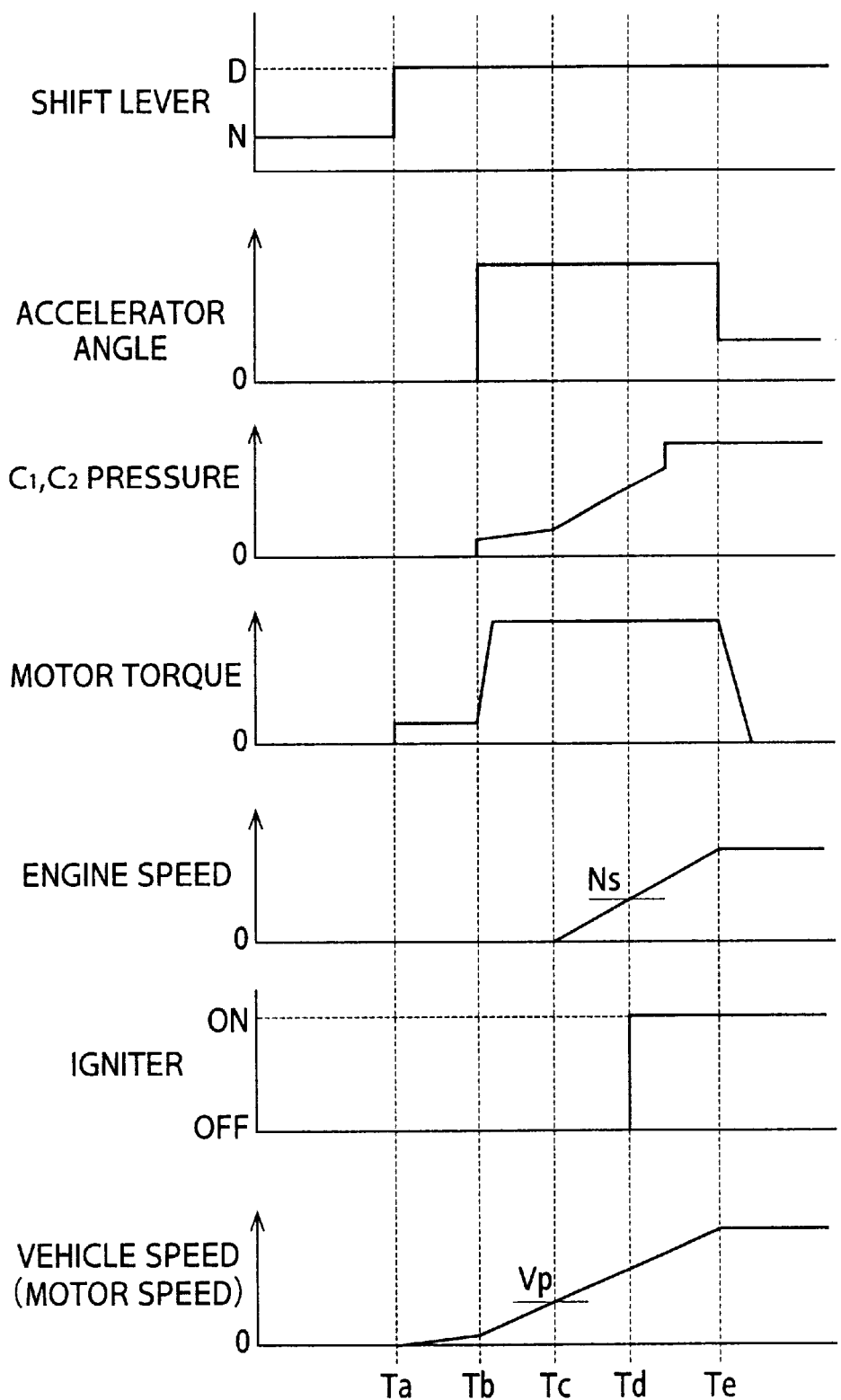
FIG. 9 is a time chart corresponding to the engine starting routine of FIG. 8.

In the first embodiment of FIGS. 7–9, the second engine-starting means 136 is operated to engage the second clutch C2 to start the engine 14 with a kinetic energy of the vehicle while the vehicle is running with the MG 16 under the control of the motor drive control means 126. However, the engine 14 may be started with a kinetic energy of the vehicle while the vehicle is running with the RMG 70. In this case, rear-motor drive control means adapted to drive the RMG 70 through the inverter 118 is provided in place of or in addition to the motor drive control means 126. The rear-motor drive control means operates the RMG 70 to drive the rear wheels 80, 82 while the power transmitting mechanism between the engine 14 and the front wheels 66, 68 is substantially disconnected with the second clutch C2 held in the released state. In this vehicle running condition, the second motor starting means 136 is operated to engage the clutch C2 to start the engine 14 with a kinetic energy of the vehicle through the engaged clutch C2 and the front wheels 66, 68.

Where the engine 14 is started with a kinetic energy of the vehicle during running of the vehicle with the RMG 70, as described above, the engine 14 can be started with the operation of the RMG 70 even when the starter-motor-defect determining means 132 determines that the starter motor 86 is defective.

Although the provisional vehicle running control initiated while the vehicle is stationary has been described above by reference to the time chart of FIG. 12, the provisional running mode (limp running mode) may be initiated while the vehicle is running (e.g., in the MOTOR DRIVE mode).

The power transmitting mechanism which is monitored by the transmitting-mechanism-defect determining means 140 may be a transmission, a torque converter or a lock-up clutch in the torque converter. The transmission may be an automatic transmission or a manual transmission, and may be a transmission having a plurality of different speed ratios, rather than the continuously variable transmission 20.

The vehicle control device according to the present invention is equally applicable to an automotive vehicle wherein a power transmitting system includes a transmission having a plurality of different speed ratios.

It is to be understood that the present invention may be embodied with various other changes, modifications and improvements, such as those described in the summary of the invention, which may occur to those skilled in the art, without departing from the spirit and scope of the invention defined in the following claims:

What is claimed is:

1. A control apparatus for controlling an automotive vehicle having drive wheels, an internal combustion engine provided as one drive unit for driving the vehicle, a starter motor for starting said internal combustion engine, a clutch device which is released to substantially disconnect a power transmitting path between said drive wheels and said internal combustion engine, and another drive unit operatively connected to drive wheels, said control apparatus comprising:

first engine-starting means for placing said clutch device in a released state thereof and activating said starter motor to start said internal combustion engine, when the vehicle is running in a running condition in which said internal combustion engine cannot be started with a kinetic energy of the vehicle while said clutch device is placed in an engaged state thereof; and second engine-starting means for placing said clutch device in said engaged state, to start said internal combustion engine with said kinetic energy of the vehicle, when the vehicle is running in a running condition in which said internal combustion engine can be started with said kinetic energy with said clutch device held in said engaged state.

2. A vehicle control apparatus according to claim 1, further comprising vehicle drive control means for placing said clutch device in said released state and operating said another drive unit to drive the drive wheels for running the vehicle.

3. A vehicle control apparatus according to claim 2, wherein said first and second engine-starting means are operable to start said internal combustion engine while the vehicle is running with said another drive unit under the control of said vehicle drive means.

4. A vehicle control apparatus according to claim 3, wherein said another drive unit is an electric motor for driving the drive wheels, and said vehicle drive control means is motor drive control means for placing said clutch device in said released state and operating said electric motor for running the vehicle, said first and second engine-starting means being operable to start said internal combustion engine while the vehicle is running with said electric motor under the control of said motor drive control means.

5. A vehicle control apparatus according to claim 4, wherein said internal combustion engine and said electric motor are provided to drive the same drive wheels of the vehicle.

6. A vehicle control apparatus according to claim 1, wherein said internal combustion engine is provided to drive one of a pair of front drive wheels and a pair of rear drive wheels of the vehicle, and said another drive unit is provided to drive the other of said pair of front drive wheels and said pair of rear drive wheels.

7. A vehicle control apparatus according to claim 2, wherein said drive wheels consist of a pair of front drive wheels, and a pair of rear drive wheels, and said automotive vehicle has a plurality of drive units including said internal combustion engine provided to drive one of said pair of front and rear drive wheels, and said another drive unit to drive other of said pairs of front and rear drive wheels, and wherein said vehicle drive control means places said clutch device in said released state and operates at least one of said plurality of drive units other than said internal combustion engine, for producing said kinetic energy of the vehicle.

8. A vehicle control apparatus according to claim 7, wherein said at least one of said plurality of drive units operated under the control of said vehicle drive control means comprises an electric motor provided to drive said one of said pairs of front and rear drive wheels.

9. A vehicle control apparatus according to claim 7, wherein said at least one of said plurality of drive units operated under the control of said vehicle drive control means comprises an electric motor provided as said another drive unit to drive said other of said pairs of front and rear drive wheels.

10. A vehicle control apparatus for controlling an automotive vehicle having a pair of front drive wheels and a pair of rear drive wheels, and a plurality of drive units including an internal combustion engine for driving one of said pair of front drive wheels and said pair of rear drive wheels, and another drive unit for driving the other of said pair of front drive wheels and said pair of rear drive wheels, said vehicle control apparatus comprising:

an engine starting device operable to operate said another drive unit for driving said other of said pair of front drive wheels and said pair of rear drive wheels, to thereby start said internal combustion engine with a kinetic energy of the vehicle running with said other pair of drive wheels driven by said another drive unit.

11. A vehicle control apparatus according to claim 10, wherein the vehicle has a clutch device which is released to substantially disconnect a power transmitting path between said internal combustion engine and said one of said pair of front drive wheels and said pair of rear drive wheels, said engine starting device being operable after the vehicle has been driven with an operation of said another drive unit with said clutch device placed in a released state thereof, to place said clutch device in an engaged state thereof to thereby start said engine with the kinetic energy of the vehicle.

12. A vehicle control apparatus for controlling an automotive vehicle having a pair of front drive wheels and a pair of rear drive wheels, a plurality of drive units including an internal combustion engine for driving one of said pair of front drive wheels and said pair of rear drive wheels and another drive unit for driving the other of said pair of front drive wheels and said pair of rear drive wheels, and a starter motor for starting said internal combustion engine, said vehicle control apparatus comprising:

starter-motor-defect determining means for determining whether said starter motor is defective; and engine starting means operable when said starter-motor-defect determining means determines that said starter motor is defective, to operate said another drive unit to drive said other of said pair of front drive wheels and said pair of rear drive wheels, for running the vehicle, to thereby start said internal combustion engine with a kinetic energy of the vehicle.

13. A vehicle control apparatus for controlling an automotive vehicle having a plurality of drive units including a first drive unit for driving one of a pair of front drive wheel and a pair of rear drive wheels through a power transmitting mechanism, and a second drive unit for driving the other of said pair of front drive wheels and said pair of rear drive wheels, said vehicle control apparatus comprising:

transmitting-mechanism-defect determining means for determining whether said power transmitting mechanism is defective; and provisional-vehicle-running control means operable when said transmitting-mechanism-defect determining means determines that said power transmitting mechanism is defective, to operate said second drive unit to drive said other of said pair of front drive wheels and said pair of rear drive wheels, for effecting provisional running of the vehicle.

14. A vehicle control apparatus according to claim 13, wherein said transmitting-mechanism-defect determining means determines whether said power transmitting mechanism fails to transmit a power of said first drive unit to said one of said pair of front drive wheels and said pair of rear drive wheels.

15. A vehicle control apparatus according to claim 13, wherein said provisional-vehicle-running control means operates said second drive unit with an energy generated by said first drive unit while said power transmitting mechanism is defective.

* * * * *